(12) United States Patent
Sasaki et al.

(10) Patent No.: US 6,766,321 B2
(45) Date of Patent: Jul. 20, 2004

(54) INFORMATION MANAGEMENT METHOD AND INFORMATION MANAGEMENT DEVICE

(75) Inventors: Kouichi Sasaki, Kawasaki (JP); Hideo Umeki, Kawasaki (JP); Mika Fukui, Tokyo (JP); Masayuki Horikawa, Kawasaki (JP); Yasuko Nakayama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 461 days.

(21) Appl. No.: 09/984,715

(22) Filed: Oct. 31, 2001

(65) Prior Publication Data

US 2002/0059222 A1 May 16, 2002

(30) Foreign Application Priority Data

Oct. 31, 2000 (JP) ........................................ 2000-333971

(51) Int. Cl.[7] .............................................. G06F 17/30
(52) U.S. Cl. ......................................................... 707/8
(58) Field of Search .............................. 707/8, 5, 100, 707/102, 200; 709/204

(56) References Cited

U.S. PATENT DOCUMENTS

| | | | | |
|---|---|---|---|---|
| 5,790,116 A | * | 8/1998 | Malone et al. | 345/763 |
| 5,918,222 A | | 6/1999 | Fukui et al. | |
| 6,078,948 A | * | 6/2000 | Podgorny et al. | 709/204 |
| 6,185,576 B1 | * | 2/2001 | McIntosh | 707/200 |
| 6,339,774 B1 | | 1/2002 | Nakayama et al. | |
| 6,415,280 B1 | * | 7/2002 | Farber et al. | 707/2 |
| 6,684,331 B1 | * | 1/2004 | Srivastava | 713/163 |

* cited by examiner

*Primary Examiner*—Safet Metjahic
*Assistant Examiner*—Sana Al-hashemi
(74) *Attorney, Agent, or Firm*—Oblon, Spivak, McClelland, Maier & Neustadt, P.C.

(57) ABSTRACT

To members of a user group, messages and documents registered in the user group are presented, while, to other users than the members of the user group, documents preset as available also to other users than the members of the user group are presented, and as a registration destination of the messages, a user group where the contents of the message, or the message and messages and documents that are most similar to the contents of the documents corresponded thereto is searched and presented at request from users.

17 Claims, 30 Drawing Sheets

| Editing operation kind / Document identification information | New creation | Replacement/Addition | Deletion |
|---|---|---|---|
| No designation | ○ (New issue of document identification information) | × | × |
| Same document identification information existing in same message tree | × | ○ | ○ |
| Same document identification information existing in other message trees or outside | ○ (Start of document monitoring) | × | ○ (Stop of document monitoring) |

MES000234533 — 501

| | |
|---|---|
| Title | Re : Conference in Next Week |
| User ID | E0998823 |
| Date and time | 2000/04/20 |
| Community ID | COM00045 |
| Text body | Attached please find and confirm the corrected file on the subject. |
| Document identification information (Document ID) | /usr/docs/gidai.txt |
| Reference message ID | MES000232195 |

521 — DOC000119233

520 —

| | |
|---|---|
| Title | Progress Follow Conference Agenda April 27th |
| Editor | F334339 |
| Date and time | 2000/04/25 |
| Community ID | COM00045 |
| Revision number | 2 |
| Text body | 1. Enforcement of functions of next version of information shared system |
| | 2. Development conditions of patent search system |
| | 3. Members' progress and problem |

| | |
|---|---|
| Community ID | COM02134 |
| Document ID<br>(Document identification information) | DOC000011215 |
| Reference message ID | MES000009822<br><br>MES000009923<br><br>MES000010091<br><br>MES000010092 |
| Publication scope | Within community |

COM02134

| | |
|---|---|
| Community name | Sales Section No.3 Daily Bulletin Board |
| Manager ID | C0014339 |
| Date and time | 1998/04/25 |
| Publication degree | Membership system |
| Members | C0012215, E3012543, D0012657, D2209854, F3345650, E0057910 |
| Message | Not public |
| Documents | DOC000011215, DOC00001216 |
| Log file name | COM02134.log |

Name　　　　　Kenji Hashimoto

Section　　　　Sales Section No.3, Sales Department

Mail address　　kenji.hashimoto@foo.com.jp

History log　　　e0057910.log

Enter your search string 641

[Is there any sample of a patent specification ?] [Search] 644

642

Search result : Communities

1. Strategic patent project
   20 documents    15 members

2. How to write a patent
   3 documents    32 members

Search result : Documents

1. Patent specification : Document shared system on network
   Date : 2000/04/22   Community : Strategic patent project 2. How to write embodiments in a system patent specification
   Date : 2000/02/10   Community : How to write a patent 3. Specification needed in application for business trip expenses
   Date : 1999/11/06   Community : Administrative procedure tips

Document registration screen

Author : Keizo Oishi

Message title [Summary of proceedings so far is created.]

I register the summary so far as a document.

Document title [Patent specification first draft]

Title of the Invention : An Information Physical Distribution System
Inventor : Keizo Oishi Claim 1

Related message list

Patent specification first draft      Author : Keizo Oishi      Date : 2000/04/22
  Reply : Patent specification
          first draft              Author : Taro Yanagiba    Date : 2000/04/23
    Reply[2] : Patent specification
               first draft         Author : Keizo Oishi      Date : 2000/04/23
  Reply : Patent specification
          first draft              Author : Kazuko Hayashi   Date : 2000/04/24

[Post] [Post destination search]

[Automatic summary]

FIG. 27

Author : Keizo Oishi    720

Message title  [Summary of proceedi]

I register the summary so far as a

There exist communities where contents similar to
the present registration contents are discussed.
Select a registration destination.

☒ Entire company product concept suggestion
   working group
☐ Strategic patent creation conference
☐ How to write a patent Document title  [Patent specificat]

Title of the Invention : An Informa
Inventor : Keizo Oishi

Claim 1

721—[Register]    [Cancel]

Related message list

Patent specification first draft    Author : Keizo Oishi    Date : 2000/04/22
  Reply : Patent specification
         first draft                 Author : Taro Yanagiba  Date : 2000/04/23
     Reply[2] : Patent specification
              first draft            Author : Keizo Oishi    Date : 2000/04/23
  Reply : Patent specification
         first draft                 Author : Kazuko Hayashi Date : 2000/04/24

[Automatic summary]

FIG. 31

| Belonging community ID | Contribution degree |
|---|---|
| COM00234 | 0.31 |
| COM00234 | 0.56 |
| COM00234 | 0.75 |

760
762
764
761 E0057910

Name         Kenji Hashimoto
Section      Sales Section No.3, Sales Department
Mail address kenji.hashimoto@foo.com.jp
History log  e0057910.log

```
420 ─┐                    Message creation
401 ─┤  Author : Ichiro Tanaka
402 ─┤  Title  : ┌─────────────────────────────────────┐
                │ Re : Minutes of proceedings of previous │
                │      conference                         │
                └─────────────────────────────────────┘
403 ─┤  Reference message : Message-ID1234
       ┌──────────────────────────────────────────────┐
404 ─┤ │ Yamada wrote :                               │
       │ > I have made the minutes of proceedings of the │
       │   previous conference.                       │
       │                                              │
       │ The development language determined in the   │
       │ conference was not c but c++, therefore, I have │
       │ corrected corresponding portions.            │
       └──────────────────────────────────────────────┘
405 ─┤  Existing document ID : Doc-ID403      ┌──────────────┐
                                         426 ─┤Cancel document│
                                              │operation     │
                                              └──────────────┘
427 ─┤┌ ─ ─ ─ ─ ─ ─ ─ ─ ─ ─ ─ ─ ─ ─ ─ ─ ─ ─ ─ ─ ─ ─ ─ ─ ─ ─ ┐
     │                 Document operation                    │
421 ─┤│ Title       : ┌─────────────────────────────────────┐│
     │                │ Second minutes of proceedings (9/3) ││
     │                └─────────────────────────────────────┘│
422 ─┤│ Document ID : ┌─────────────────────────────────────┐│
     │                │ Doc-ID403                           ││
     │                └─────────────────────────────────────┘│
     │  ┌──────────────────────────────────────────────────┐ │
423 ─┤│ │ Minutes of proceedings of second conference       │ │
     │  │                                                   │ │
     │  │   Date and time : 2000/8/30 10:00 ~ 12:00        │ │
     │  │   Place : Third conference room                  │ │
     │  │   Participants : Yamada, Suzuki, Sato, Tanaka (clerk) │ │
     │  │                                                   │ │
     │  │   · Development language of project A            │ │
     │  │     Prototype development shall be made with c++. │ │
     │  └──────────────────────────────────────────────────┘ │
     │                                           ┌─────────┐ │
424 ─┤│ File upload :          ┌──────────────┐  │Reference│ │
     │                         └──────────────┘  └─────────┘ │
425 ─┤│ Editing operation type : ┌──────────────┐           │
     │                           │ Replacement ▼│           │
     │                           └──────────────┘           │
     └ ─ ─ ─ ─ ─ ─ ─ ─ ─ ─ ─ ─ ─ ─ ─ ─ ─ ─ ─ ─ ─ ─ ─ ─ ─ ─ ┘
                                               ┌──────┐
                                          428 ─┤ Send │
                                               └──────┘
```

FIG. 35

INFORMATION MANAGEMENT METHOD AND INFORMATION MANAGEMENT DEVICE

CROSS-REFERENCE TO RELATED APPLICATIONS

This application is based upon and claims the benefit of priority from the prior Japanese Patent Application No. 2000-333971, filed Oct. 31, 2000, the entire contents of which are incorporated herein by reference.

BACKGROUND OF THE INVENTION

1. Field of the Invention

The present invention relates to management of shared information that is shared among a plurality of users via a network, more specifically, the invention relates to an information management method for plural users to exchange shared information and an information management device that makes the most thereof.

2. Description of the Related Art

Conventionally, as one example of systems employed in information exchanges among plural users via a network, well known is (1) a system wherein accumulated information such as documents and the like accumulated on a database is maintained by plural users in collaboration, and updated contents, messages and the like added to this accumulated information are notified to certain users.

In a system for managing accumulated information like the (1), since editing existing accumulated information is the base of its operation, the contents of messages sent to users are limited to results of editing work or notices of messages, accordingly there has been a problem that a lively discussion is unlikely to happen around a certain topic of information as a base.

While, as another example, well known is (2) a system including a mailing list, a bulletin board system, and the like, wherein flow type communications in which a user sends a message and other users reply to it and messages are exchanged among users are supported.

Such a flow information oriented system as the (2) is employed for lively communications among users. For example, a familiar example of this type of system is a bulletin board system wherein discussions are made around the contents of a homepage on WWW of internet. In such systems in the prior art, however, when a large amount of flow information is registered at one time, users have to read all the information chips one after another in order to grasp the contents, which has been a problem with the prior art. In some of mailing lists and the like, volunteer users post summarized messages in response to messages that have so far show up there, nevertheless, such messages will end up to bury themselves in a huge amount of other messages as part of flow information. Difficulties in mediating discussions will lead to difficulties in bring discussions to a conclusion, and also lead to difficulties for new users to such systems to grasp the flow of discussions made so far there, which had been another problem in the prior art.

On the other hand, there is a demand for finely setting the scope where the respective items of information are shared, in consideration of sharing information in a specified organization. For example, there may be a case where it is intended that users who can participate in discussions in a mailing list should be limited to users belonging to a certain group, and at the same time, stock information obtained as results of discussions should be made public also to the outside of the group.

In the systems as the (1) and (2), many of them fail to provide a method to flexibly set whether or not to make public the information shared in a certain group to other users out of the group.

As mentioned above, in those systems conventionally employed for information exchanges among plural users via a network, it has been difficult to accumulate and manage the transitions of discussions through exchanging messages in correspondence with documents created, edited, and read in the discussions, by connecting flow information of messages to documents created as one fruit summarizing message contents, and accumulated documents and the like referred to in messages.

Consequently, for example, the work to summarize the contents of messages exchanged among plural users as flow information in a specific user group into a single document has been left to a volunteer user, who in creating such a document requires a great amount of labor to analyze and summarize all the transitions of flow information by himself, as a result, creation of a document as the result of discussions has been unlikely to be dame lively, which has been still another problem with the prior art.

Even in the environment where such problems as mentioned above have been solved in respective user groups, there is still a problem that exchanges among plural user groups cannot be made flexibly in making public worthy information obtained as the result of discussions by flow information in a user group consisting of specific participants and part of information now under discussions to the outside of the user group. That exchanges among plural user groups cannot be made flexibly may cause opinion exchanges about a topic that relates to plural groups not to be made easily, and even for discussions in each user group to be piled up.

Further, when there are plural user groups that exchange discussions on a specific topic, users who are going to participate in these groups find it difficult to know in which user group they should take part, as a consequence, the number of new users to user groups may not increase, leading to stagnation of discussions in user groups, which has been still other problem seen in the prior art.

BRIEF SUMMARY OF THE INVENTION

The present invention has been made in consideration of the problems in the prior art, accordingly, an object of the present invention is to provide an information management method and an information management device that enables, in an environment wherein, in plural user groups to discuss about a specific topic, documents and messages posted, updated, and referred to in discussions are managed in correspondence with transitions of discussions by messages exchanged among users as members of each user groups as shared information of the user group, to flexibly conduct exchanges among plural user groups via this shared information, and to promote the participation of new users to respective user groups.

According to one aspect of the present invention, there is provided a document management method for, concerning the document that can be owned jointly by the respective users of the plural terminal devices via a network, renewing the document by reflecting an editing intention shown by each of the users while managing the renewal history of the document. The method comprises generating a community in which an access authority is controlled; generating a plurality of message trees in the community, each of which accepts a message from users using the terminal devices, the message being in reply to the other message in the message tree; editing a plurality of documents each of which is associated with one of the message trees; generating additive message subjected to a change within one of the documents, the additive message being written into the corresponding message tree by one of the users who made the change; generating a bidirectional reference between the additive message and the corresponding document; and searching for one of the documents as an instructive knowledge for at least one of the users in the community, wherein the corresponding massage tree is referred to by the one of users using the found document.

BRIEF DESCRIPTION OF THE SEVERAL VIEWS OF THE DRAWING

FIG. 12 is a diagram showing an example of a check table used for judging possibility of combination of document identification information and kinds of editing operation.

FIG. 16 is a diagram showing a data structure of a message to be accumulated in a message accumulation portion.

FIG. 17 is a diagram showing a data structure of a document to be accumulated in a document accumulation portion.

FIG. 18 is a diagram showing an example of control data of shared information to be accumulated in an information management portion.

FIG. 19 is a diagram showing an example of community information to be accumulated in a community information accumulation portion.

FIG. 20 is a diagram showing an example of user information to be accumulated in a user information accumulation portion.

FIG. 22 is a view showing a display example of a search result display screen.

FIG. 25 is a view showing a display example of a message registration screen.

FIG. 27 is a view showing a display example of a community search result display screen.

FIG. 31 is a diagram showing another example of user information accumulated in a user information accumulation portion.

FIG. 35 is a view showing still another example of a message registration screen.

DETAILED DESCRIPTION OF THE INVENTION

Embodiments of the present invention will be illustrated by reference to the drawings below.

[First Embodiment]

(1) Structure

Figure 1:
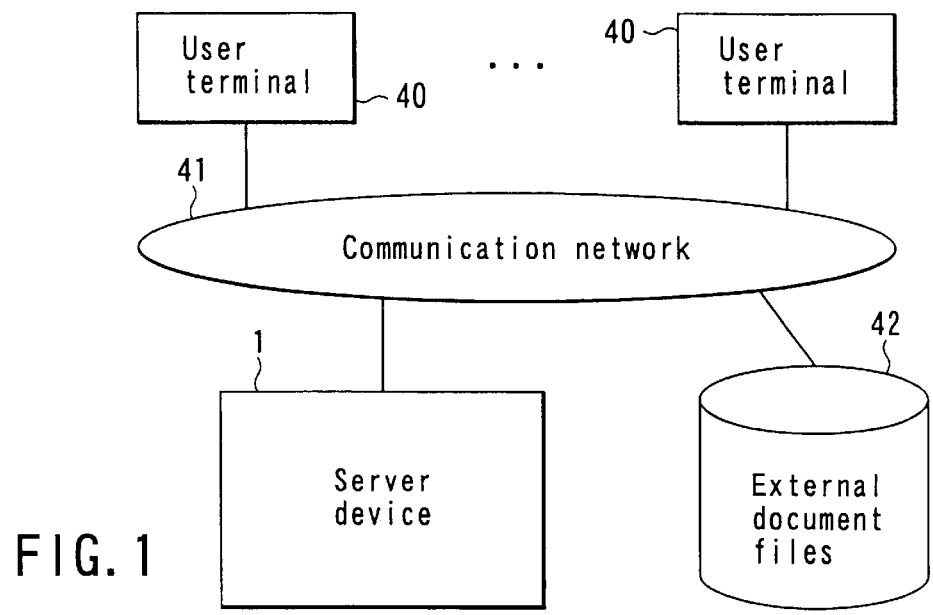
FIG. 1 is a diagram showing a structural example of an entire information shared system for realizing a document management method according to a embodiment of the present invention.

FIG. 1 is a schematic diagram showing a structural example of an entire information shared system according to the present invention. A user, by using a user terminal 40, communicates with a computer as a server device 1 (hereafter referred to as document management device) via a communication network 41, and thereby enjoys information services according to the present invention.

The server device 1 is comprised of a computer communicably connected with plural user terminals 40 via the communication network 41, and the user terminals 40 communicate with this server device 1, thereby enable for users to participate in discussions in a user group where users discuss about specific topics (hereafter referred to as community), or discussions in other communities. That is, for example, as in a bulletin board system, by use of an input screen that the server device 1 provides to the user terminals 40, a user creates a message or a message and document, and designates the community to which the user belongs and registers it to the server device 1 (this is referred to also as "post"), then users as members of the community may read the message and document via the server device 1. Or, as in a mailing list, such a message and document may be forwarded to respective members of the community via the server device 1.

In the server device 1, posted messages, and documents created, updated, and referred to in discussions are corresponded to the transitions of discussions that users of the members of each community exchange via the communication network 41, and thereby these messages and documents are managed as shared information of respective members of the community.

With respect of shared information registered and managed in the server device 1 per community, all the shared information of a community may be presented to the members of the same community, while to members of other communities, only shared information of a predetermined range may be presented. Preferably, documents registered in each community may be presented to members of other communities.

When a user posts a message created by use of the input screen provided by the server device 1, the user search for a community suitable for posting the message, and designates it.

Documents managed as shared information per community include, for example, web pages and the like. To these documents, users can not edit or update anything by use of the server device 1, therefore, herein these are referred to as external documents (on the other hand, those documents that can be created and edited and updated by use of the server device 1 are referred to as internal documents in many cases). However, even these external documents may be objectives of monitoring of the server device 1. As shown in FIG. 1, files of external documents (external document files 42) should be stored in another server device comprising a specific computer that may be accessed from the server device 1 via the communication network 41. The server device 1 can monitor whether designated external documents have been updated by a person having editing authority or not. Documents to be objectives of monitoring are not limited to external documents, but may be internal documents.

Figure 2:
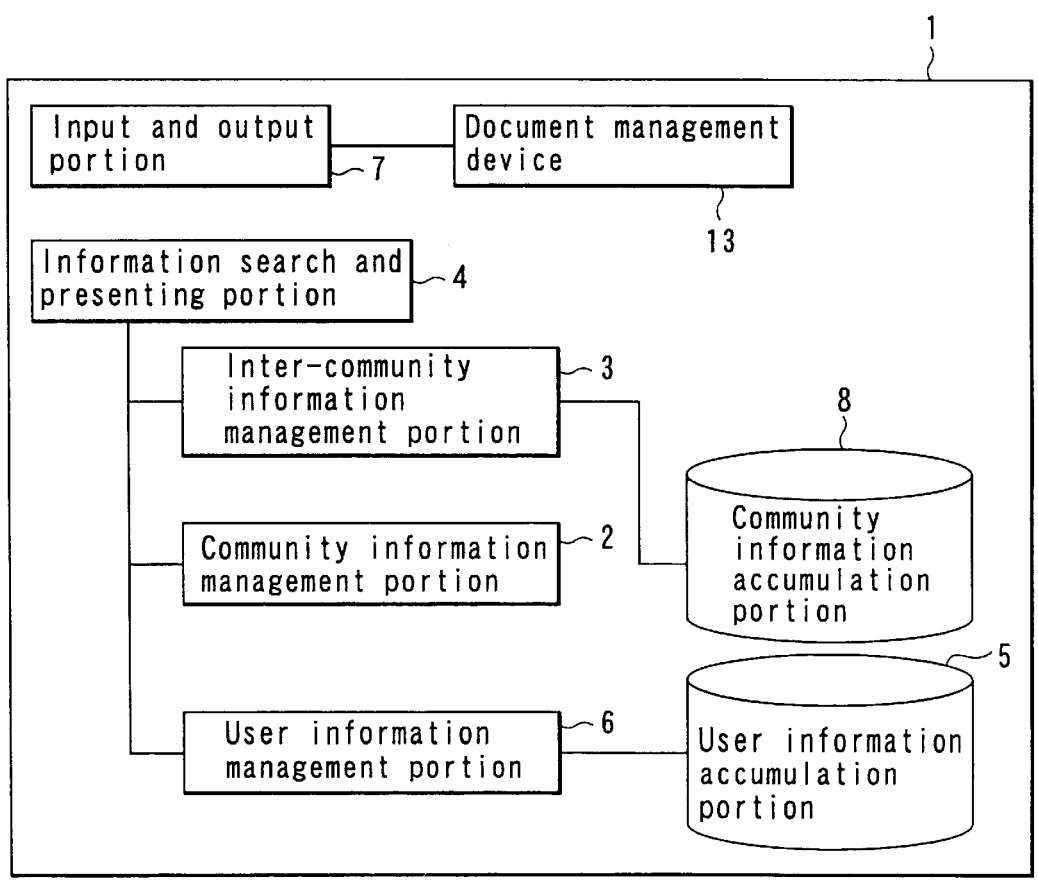
FIG. 2 is a diagram showing a structure of functions of a server device.

FIG. 2 is a diagram showing a structure of functions of a server device 1, which comprises a community information management portion 2, a Inter-community information management portion 3, an information search and presenting portion 4, a user information accumulation portion 5, a user information management portion 6, an input and output portion 7, and a community information accumulation portion 8.

The community information management portion 2 is for totally managing plural communities according to community information accumulated in the community information accumulation portion 8 (attributes of respective communities, including community names, participating users, scopes of information publication, etc.).

When a search request is input by a user through the input and output portion 7, the Inter-community information management portion 3 gives the search request to the community information management portion 2 as input, and sends a search result to the information search and presenting portion 4 according to the publication scope of information fed back.

Figure 3:
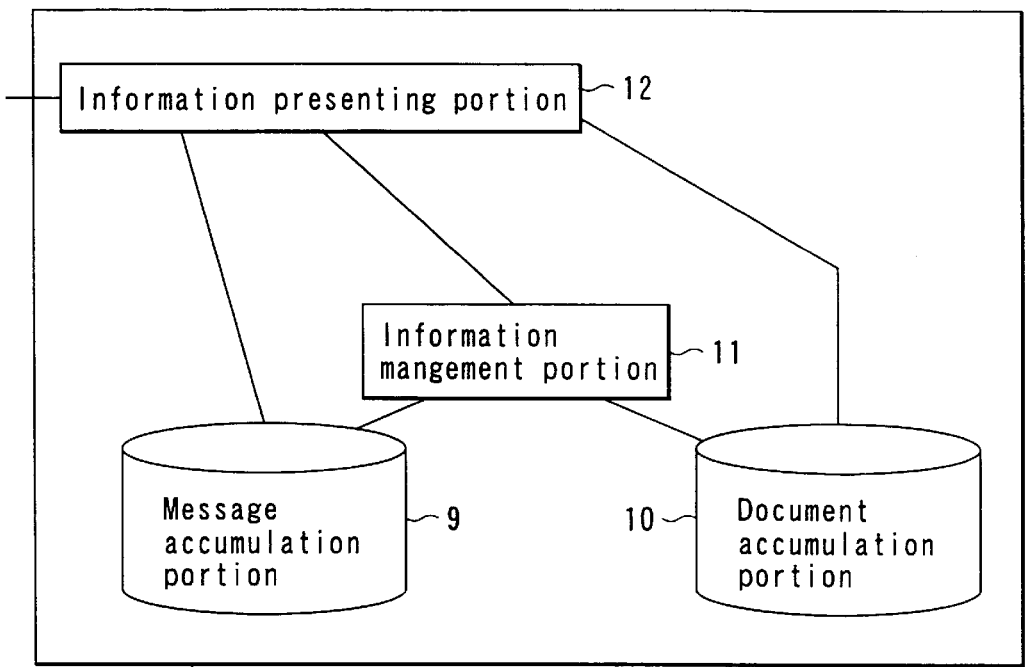
FIG. 3 is a diagram showing a structure of functions of a community information management portion.

FIG. 3 is a schematic diagram showing a structure of functions of a community information management portion 2, which comprises a message accumulation portion 9, a document accumulation portion 10, an information management portion 11, and an information presenting portion 12.

The message accumulation portion 9 accumulates messages created by users, and these messages may be plain texts, or document data describing personal knowledge and know-how chips, computer software, audio information, or image information. Comments accumulated herein cannot be edited or updated.

The document accumulation portion 10 accumulates document data. This document data includes computer software, audio information, and image information. Documents accumulated herein may be edited and updated by plural users. Documents may be documents summarizing plural messages accumulated in the message accumulation portion 9.

The information control portion 11 manages the relations between the messages accumulated in the message accumulation portion 9 and the documents accumulated in the document accumulation portion 10, and document update history information.

The information presenting portion 12 sends an information search request from a user to the information management portion 11, and also displays information output by the information management portion 11.

(2) Document Management per Community

Next messages and documents to be accumulated in the message accumulation portion 9 and the document accumulation portion 10 are explained hereinafter.

Figure 4:
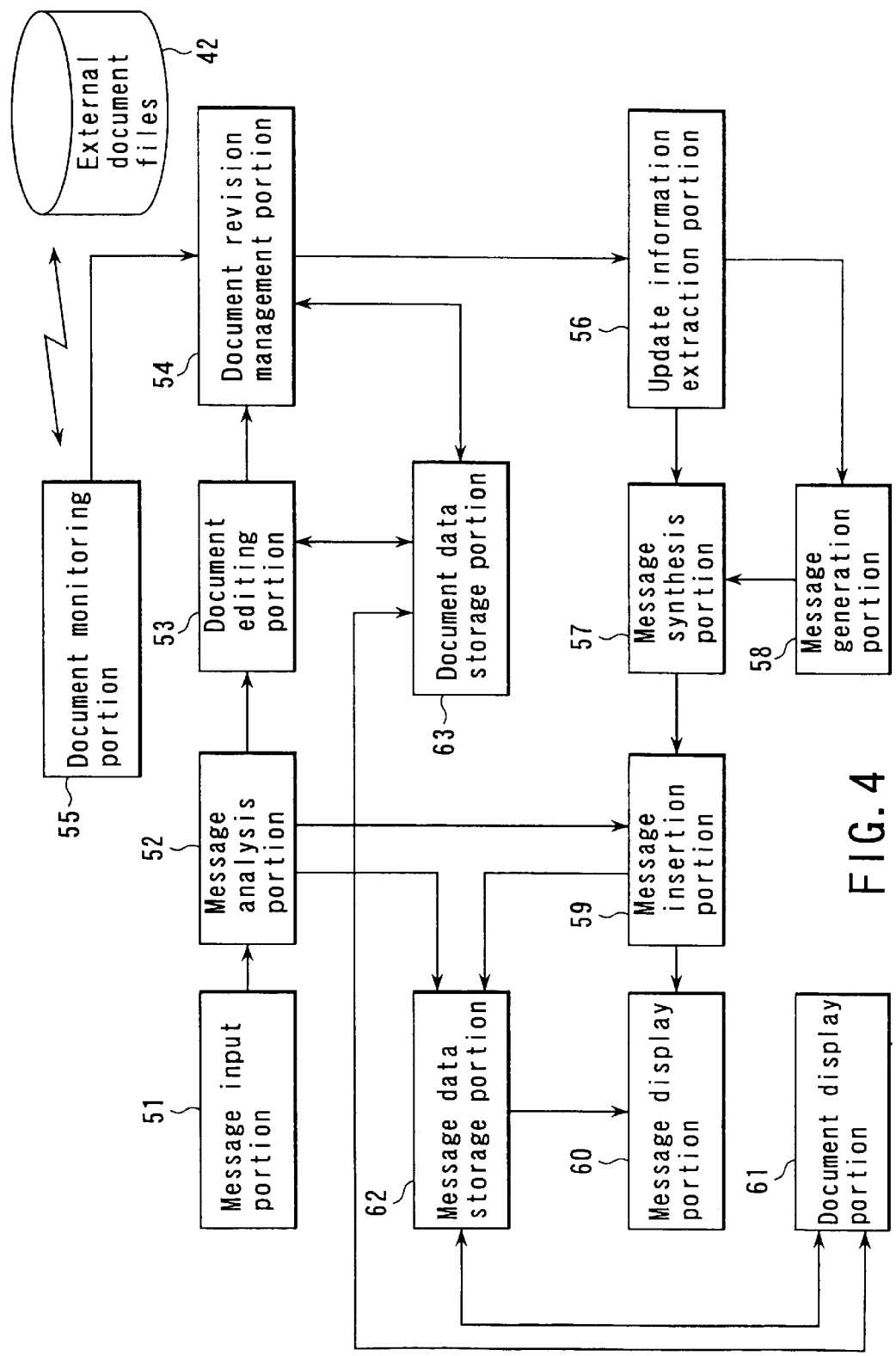
FIG. 4 is a diagram showing a structure of functions of a document management device.

FIG. 4 is a diagram showing a structure of functions of a document management device 13 for accumulating messages and documents to the message accumulation portion 9 and the document accumulation portion 10 in FIG. 3. By the way, a message data storage portion 62 corresponds to the message accumulation portion 9 in FIG. 3, while a document data storage portion 63 corresponds to the document accumulation portion 10 in FIG. 3. Interactions between the document management device 13 and users are made through the input and output portion 7 in FIG. 2.

In FIG. 4, a message input portion 51 provides a specific input screen to the user terminals 40, and via this input screen, users input messages for creating and editing documents and messages of only message texts (message texts). Comments created by users included, messages texts, and (in the case of reply messages to existing messages) identification information of existing messages users can refer to (reference message ID), and in the case accompanied with document editing operation, document identification information of editing objectives, kinds of editing operations, and editing data are included. Kinds of editing operations, document identification information, and editing data are collectively referred to as document operation data.

The kinds of editing operations includes operations for document editing preset (provided from the document management device) such as "new creation", "replacement", "addition", "deletion" and the like, and in carrying out a document editing operation, a user selects one of these on the input screen provided from the message input portion 51.

The document identification information is information comprising codes to specify sharable documents via the communication network 41, for example, numeric and code strings given by a specified rule in the document management device, or web page URL, a pass name on a file system, and the like.

The editing data is data to be applicable to a document of editing objective, and means the editing data corresponding to the selected kinds of editing operations, i.e., a newly created document in the case where the kind of editing operation is "new creation", a replacement position and replaced document in the case where the kind of editing operation is "replacement", data to be added to editing objective document and addition position in the case where the kind of editing operation is "addition", while deletion position (document to be deleted may be included) in the case where the kind of editing operation is "deletion".

The message analysis portion 52, when document editing data is included in messages input for the input portion 51, checks the kind of editing operation in this document editing data and the combination of document identification information and editing data and their contents. Checked document operation data is stored into and managed by the message data storage portion 62, and also sent to the document editing portion 53. When document operation data is not included in the messages input from the input portion 51, input messages are transferred to the message insertion portion 59 as messages to be placed.

By the way, "insertion" herein means, for example, as writing a message on a bulletin board in a bulletin board system, writing a message to be placed into the message data storage portion 62 so that can referred to such a message on the user terminals 40 of users as members of community, or on the user terminals 40 of unspecified number of the general users. This may be referred to registering (or posting) a message to a community.

In the document editing portion 53, editing operation using editing data is carried out on document designated by the document identification information, according to the document operation data (for example, the latest one stored in the document data storage portion 63). For example, when the document identification information is not yet designated, and the kind of editing operation is "new creation", document identification information is newly issued according to a specified rule. When document identification information is designated, and the kind of editing operation is "replacement", a text at the replacement position included in editing data is replaced by replacement text included in editing data, thereby document editing is carried out. When document identification information is designated, and the kind of editing operation is "addition", an additional text included in editing data is added to the additional position in the editing data to the designated document, thereby document editing is carried out. When document identification information is designated, and the kind of editing operation is "deletion", to the designated document, a text to be deleted is deleted from the deletion position included in editing data, thereby document editing is carried out.

The document revision management portion 54 is started from the document editing portion 53, after document edition in the document editing portion 53, and additionally creates a new document revision information corresponding to the document identification information designated at the start. That is, the document revision management portion gives to a document edited in the document editing portion 53 a revision number showing how many times the edited document has been revised (for example, when the third editing has been made, revision number "3" is given, while, when a document is newly created, revision number "0" is given), and for example, a document file of this latest revision number is created in the folder corresponding to the document identification information created in the document data storage portion 63, and the edited document and editing time are saved, thereby, a new document revision information is additionally created. When the document monitoring portion 55 detects that a document of monitoring objective (including external documents) is updated, the document revision management portion 54 is started and additionally creates a new document revision information corresponding to the document identification information designated at the start. That is, to the updated document of monitoring objective, the document revision management portion gives to the updated document of monitoring objective a revision number showing how many times the updated document of monitoring objective has been updated, and for example, creates a document file of this latest revision number as document revision information in the folder corresponding to the document identification information created in the document data storage portion 63, and copies the updated document of monitoring objective in this folder, and also saves the time of update.

In the document monitoring portion 55, to document of document identification information (including external documents) designated by message created by a user as monitoring objective, periodically or irregularly, document of monitoring objective is accesses, and the current contents of the document and the contents of document of the latest (having the largest revision number) document revision information contained in the document data storage portion 63 obtained via the document revision management portion 54 are compared, and when difference is detected (when update is detected), the document monitoring portion makes the document revision management portion 54 create the latest revision information of the document of monitoring objective.

The update information extraction portion 56 is started after the document revision management portion 54 creates document revision information, and extracts, from document revision information transferred at the start (document revision information of the latest revision number and document revision information of the one before the latest revision number), update information comprising difference data between the latest document (including external documents) stored in the document data storage portion 63 and the document before that and kinds of document operations (as same as editing operation, new creation, addition, correction, deletion, etc.). At extraction of difference data, it is effective to use a difference detection program of line unit or character unit, for example, like diff command of UNIX.

The message generation portion 58, when the document monitoring portion 55 detects update of document of monitoring objective, creates message text, on the basis of update information of this document of monitoring objective extracted by the update information extraction portion 56, and obtains reference message ID, thereafter, transfers this created message text and reference message ID to the message synthesis portion 57.

The message synthesis portion 57 synthesizes message text and reference message ID input in the message input portion 51, message text and reference message ID generated by the message generation portion 58, other document identification information, update information and the like, thereby creates insertion message.

The message insertion portion 59 issues message ID to insertion message, and further, when there exist insertion message and message ID, and document of editing objective, then corresponds the document identification information, revision number of document updated by the message or, revision number of the document at which the insertion message has been created when document update was detected, and the like, and stores into and managed in the message data storage portion 62, and also manages a series of message groups linked by reply relation by the reference message ID in insertion message. In this case, in principle, message without message ID is of a tree structure as "root".

The message display portion 60 displays insertion message designated by message ID and message tree including insertion message to the user terminals 40.

The document display portion 61 displays document of document identification information designated from the user terminal 40. At this moment, access information to message is also displayed so that message of editing operation to message (insertion message) should be referred to.

The message data storage portion 62 stores message input from the message input portion 51 (including message text, document operation data, etc.), insertion message, and the like.

The document data storage portion 63 stores (registers) document revision information of all document identification information, in correspondence with document identification information. By the way, existing document being edited and updated by message registered in a certain community by a user, and new document revision information being generated, and stored in this document data storage portion 63, may be referred to as document being registered together with message.

Figure 5:
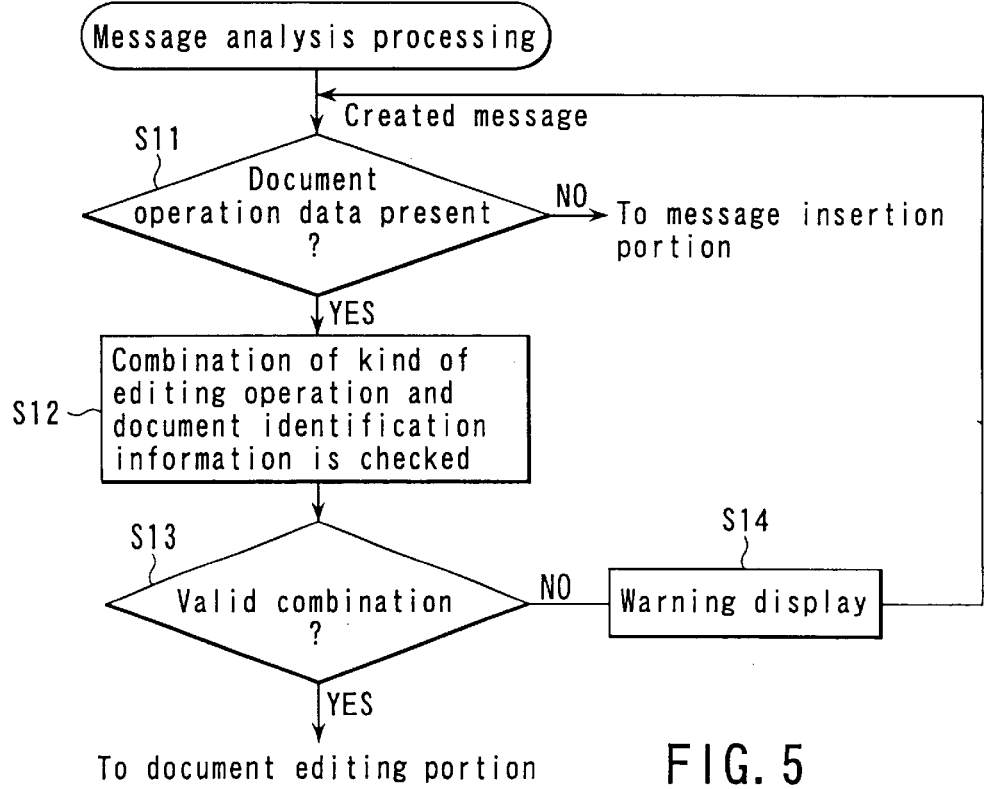
FIG. 5 is a flow chart for explaining processing actions of a message analysis portion.

Next, in reference with the flow chart shown in FIG. 5, the processing actions of the message analysis portion 52 in FIG. 3 will be explained hereinafter.

With respect to message data input from the message input portion 51, first at step S11, it is judged whether or not there is designation of kind of editing operation in document operation data, if not, message is only message text, or message text and reference message ID, therefore, it is transferred as insertion message to the message insertion portion 59.

On the other hand, if there is designation of kind of editing operation, in step S12, the combination of kind of editing operation and document identification information is collated with a check table. As an example of check table here, such one as shown in FIG. 12 is considered. Explanations on FIG. 12 will be made in detail later herein.

Next, in step S13, when it is judged as an effective combination, then document operation data is sent to the document editing portion 53, while, it is judged as invalid, the procedure goes on to step S14, wherein a warning is given, and the message input portion 51 urges user to input once again.

Figure 6:
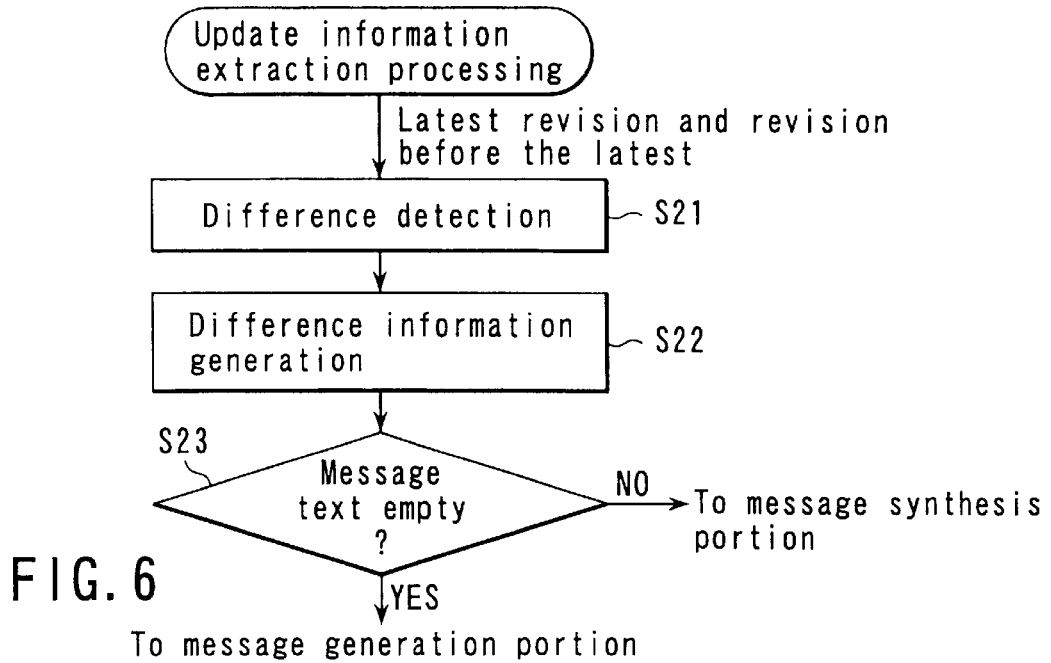
FIG. 6 is a flow chart for explaining processing actions of an update information extraction portion.

Next, in reference with the flow chart shown in FIG. 6, the processing actions of the update information extraction portion 56 in FIG. 4 will be explained hereinafter.

When the document revision information of the latest revision number and that of the revision number before the latest are obtained from the document revision management portion 54, in step S21, difference between the documents of those two revision numbers is detected. In step S22, the kind of document operation showing which part of the documents have been changed in what manner is judged from the difference data detected, and thereby, difference information comprising difference data and determined kind of document operation is generated. For example, when there is document operation data, the kind of editing operations (one of new creation, addition, change, and deletion) and editing data may be employed as difference information, but when there is not document operation data or in the case of external documents, the kind of document operation is determined by comparison of documents before and after.

Next, in step S23, when message text is empty, the process goes on to the processing at the message generation portion 58, while, when there is message text created by a user, the process goes on to the processing at the message synthesis portion 57.

Figure 7:
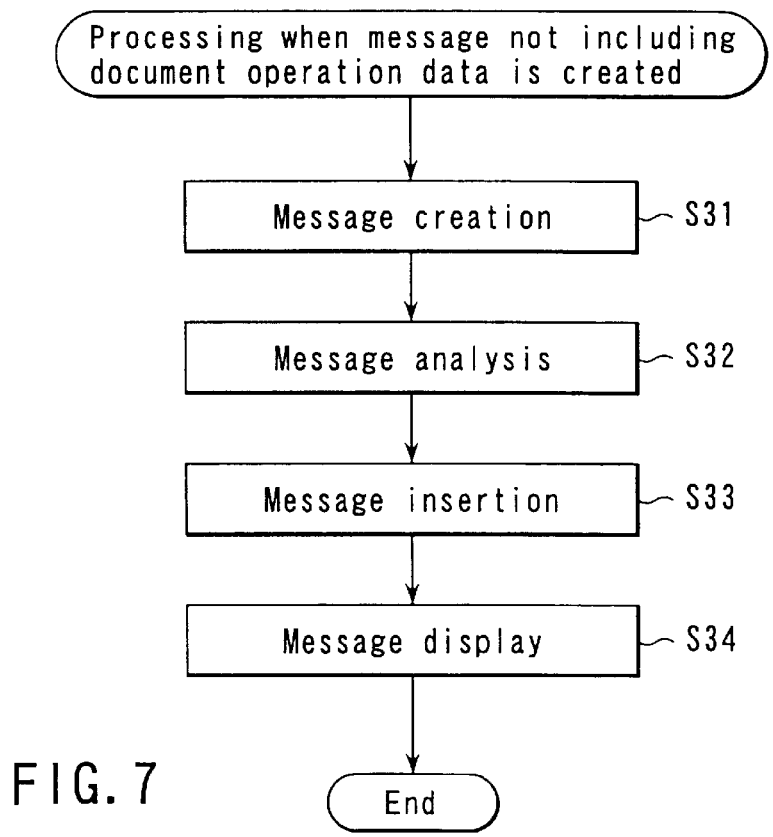
FIG. 7 is a flow chart for explaining processing actions at the moment when a message not including document operation data is created.

Next, in reference to the flow chart shown in FIG. 7, the outline of the processing actions in the case where message not including document operation data is created (processing actions from message creation to message display) is explained. This is almost same as the flow of processing actions from creation of new message and replay message to the display thereof in an information exchange system such as a mailing list and a bulletin board system. First, in step S31, message created by a user is input from the user terminal 40 to the message input portion 51, and in step S32, when the message analysis portion 52 judges that there is not document operation data in this message, then the process goes on to the processing at the message insertion portion 59 at step S33, wherein it is considered as only message text, or as a insertion message comprising message text and reference message ID, and message ID is given to message, and it is stored into the message data storage portion 52. In step S34, at request from user, this insertion message is displayed on the user terminal 40.

Next, in reference to the flow chart shown in FIG. 8 and FIG. 10, the processing actions in the case to edit document from message will be explained.

Figure 10:
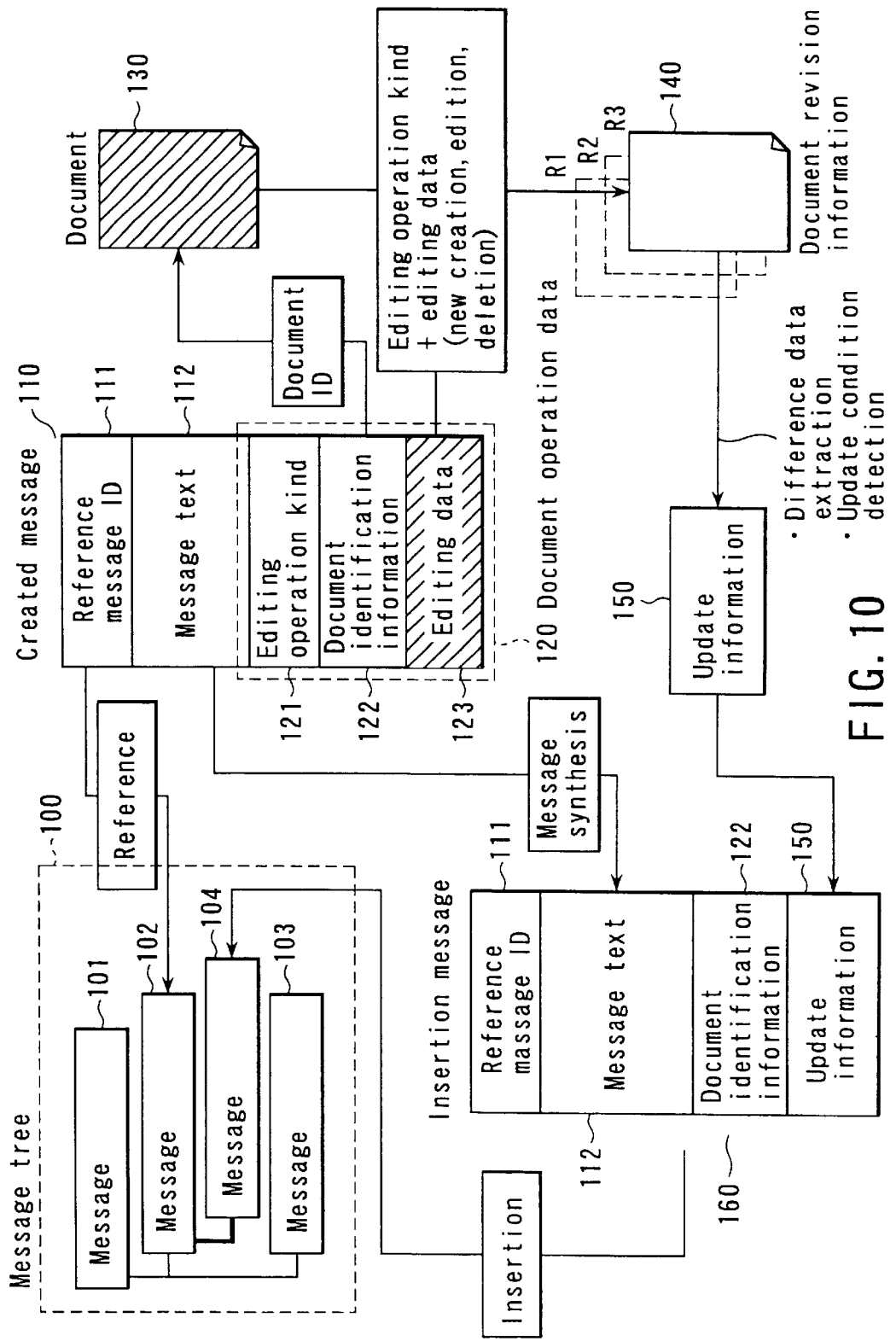
FIG. 10 is a diagram for explaining processing actions at the moment when a message including document operation data is created.

In FIG. 10, a message tree 100 shows part of message trees of messages (insertion messages identified by message ID) exchanged among users as members of a certain group (community) where users can participate in discussions. Herein a message tree means a series of message groups connected by replay relations. A message tree is a tree structure having message of sent side as parent node, and message of replying side as child node thereof. Reference message ID that a certain message has means ID of original message that the message replies. For example, in the message tree 100, message 102 is a replay to message 101, and reference message ID that the message 102 has is same as message ID that the message 101 has.

Herein, the case where there are only 3, i.e., messages 101, 102, and 103 in the message tree 100 is supposed, and the case to create a new message as a reply message in response to the message 102 is explained.

Figure 8:
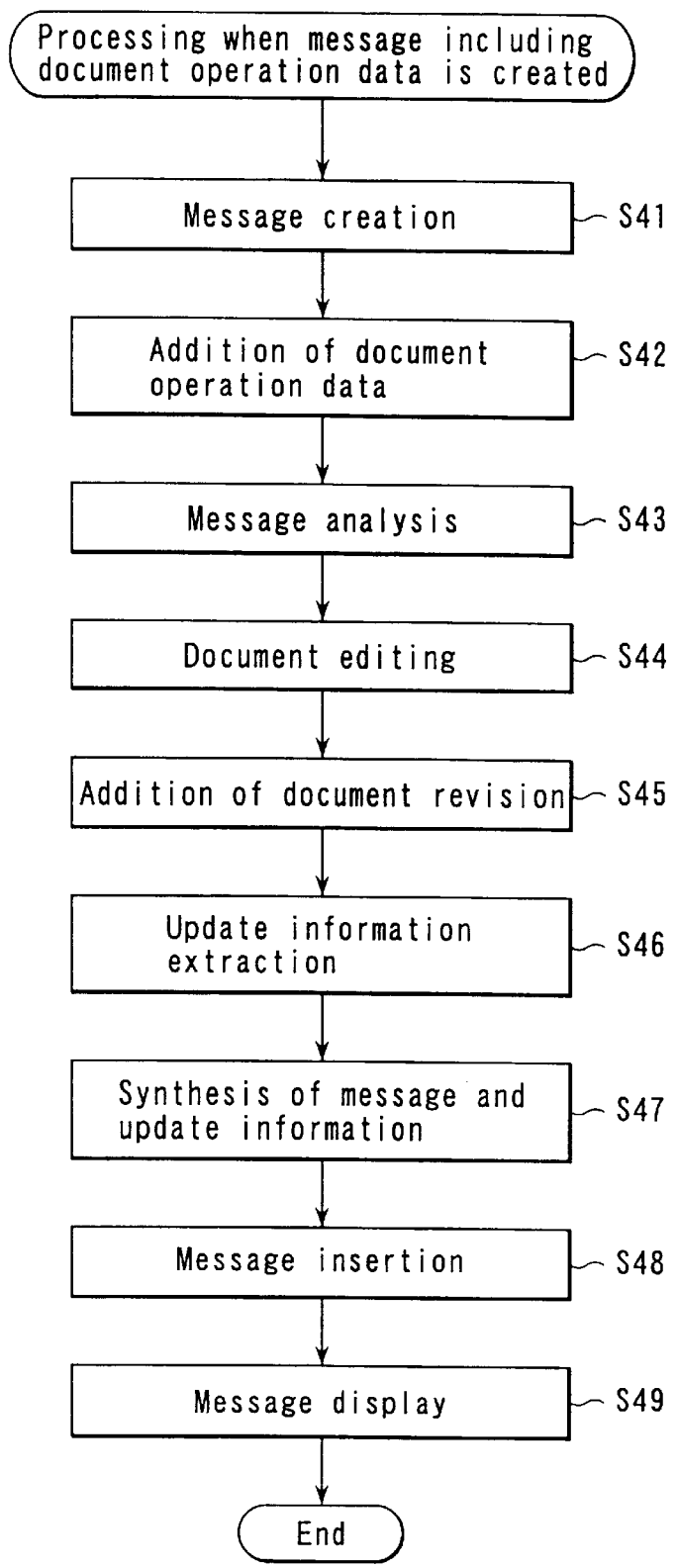
FIG. 8 is a flow chart for explaining processing actions at the moment when a message including document operation data is created.

First, in step S41 in FIG. 8, a user creates message from the user terminal 40, that is user creates message text and designates reference message ID, and in following step S42, document operation data is added. Comment created in the manner corresponds to created message 110 in FIG. 10.

In step S43 in FIG. 8, the created message 110 is analyzed in the message analysis portion 52, and whether there is reference message ID or not, whether document operation data is integrated or not and the like are checked.

In FIG. 10, the reference message ID in the created message 110 is one where message 102 is designated, and this created message 110 further comprises message text 112, and document operation data 120. The document operation data 120 comprises editing operation kind 121, document identification information 122, and editing data 123. The editing operation kind is one that user has selected among preset editing operation kinds such as "new creation", "replacement", "addition", "deletion" and the like. Document identification information need not to be specified in the case of "new creation", and system will give a new document identification information according to a specific rule.

In step S44 in FIG. 8, the document editing portion 13 actually carries out document editing, on the basis of given document operation data. In FIG. 10, to document 130 that document identification information in the created message 110 points out, the editing operation kind 121 and the editing data 123 given by document operation data are applied.

Next, in step S45, the document revision management portion 54 additionally creates the latest document revision information of document corresponding to the document identification information 122. That is, in FIG. 10, as document information 140 to which a new revision number (herein, for example, one edited for the third time (revision number "3"), to de described "R3") is given, the document edited by the document editing portion 13 is stored into the document data storage portion 63.

Further, in step S46, in the update information extraction portion 56, the contents of document of the latest revision number of the document designated by document identification information and the contents of document of the revision number before the latest are compared, thereby update information is extracted.

In FIG. 10, from document revision information 140 of "R3" and document revision information of "R2", document data before and after editing are obtained, and data are compared, thereby update information 150 is obtained.

Update information is information comprising text showing update position and document operation kind (update condition), for example, "The following portion has been added to part of document", and in this case, part of sentence actually added.

In step S47 in FIG. 8, at least message text and update information are synthesized to create insertion message. In FIG. 10, this corresponds to creation of insertion message 160 comprising reference message ID 111 in the created message 110 and message text 112, document identification information 122 and update information 150.

In step S48, message ID is given to the insertion message 160 in the message insertion portion 59, and the insertion message 160 is stored into the message data storage portion 62, as message corresponding to the message 104 that is child node of the message 102 on the message tree 100 in FIG. 10.

Finally, in step S49, at request from a user, the message 104 is displayed as one of message groups whose replay relations are managed by the message tree 100 in FIG. 10.

Next, in reference with the flow chart shown in FIG. 9 and FIG. 11, document monitoring processing actions are explained hereinafter.

Figure 9:
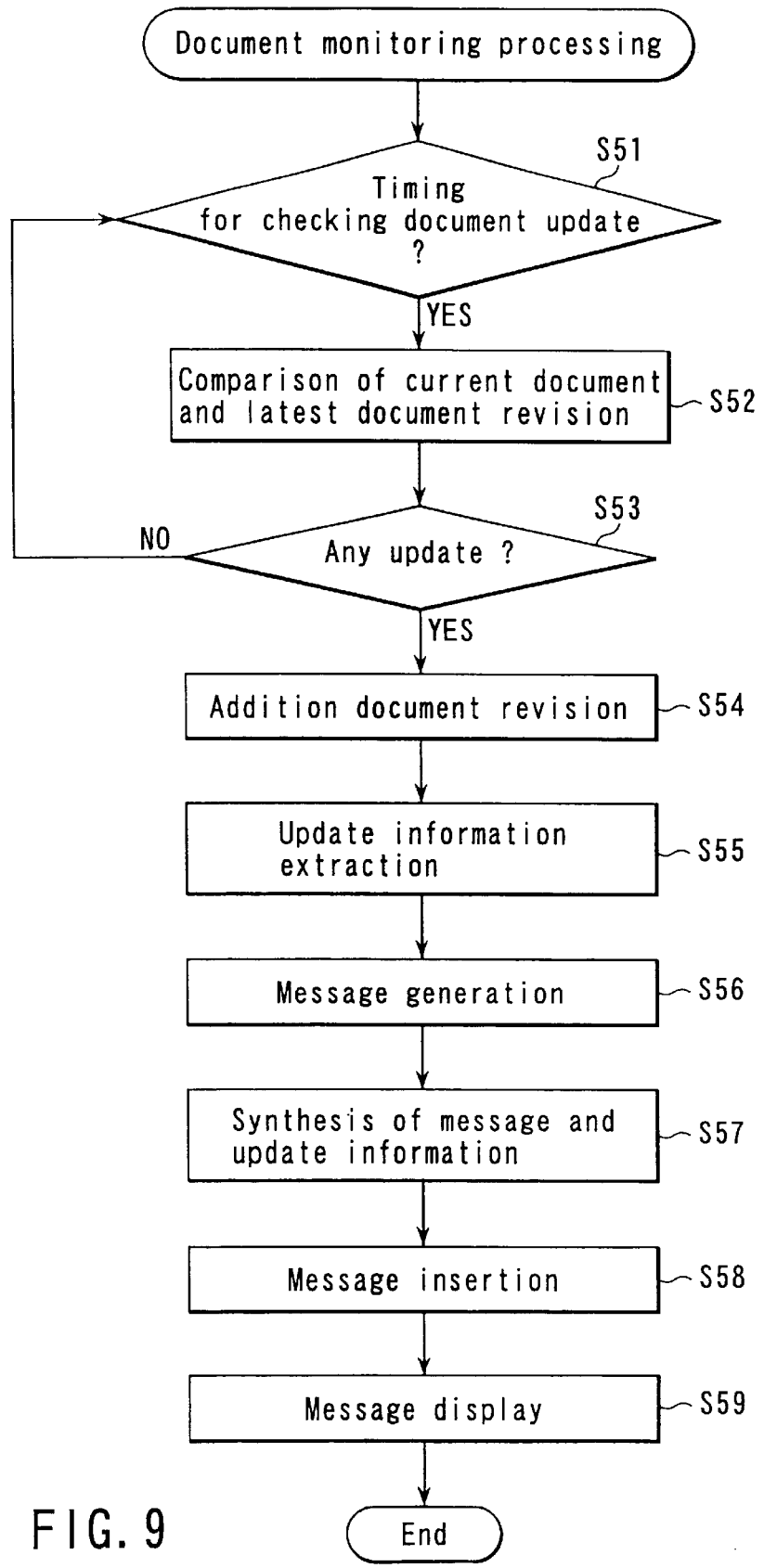
FIG. 9 is a flow chart for explaining document monitoring processing actions.

In step S51 in FIG. 9, the document monitoring portion 55 judges whether or not it is now the timing for checking document update of documents (including external documents). With respect to the document to be objective of document monitoring, regularly or irregularly (for example, at instruction from a user), document update is checked. In FIG. 11, it is shown that document 230 pointed out by document identification information 213 designated in existing created message 201 created in the past and stored in the message data storage portion 62 is under monitoring by the document management device.

Next, in step S52, the document monitoring portion 55 compares the current contents of document of monitoring objective and the contents of document of the latest revision number of document of the monitoring objective. This, in FIG. 11, corresponds to that the contents of the document 230 are compared with the document revision information 240 of the latest revision number ("R2") of the document 230 stored so far.

In step S53, it is judged whether or not there is difference between the current contents of the document 230 of monitoring objective and the document of the latest revision number of the document of monitoring objective, and if there is difference, the process goes on to step S54, wherein the latest document revision information of document of monitoring objective is added by the document revision management portion 54. In FIG. 11, this corresponds to that the current contents of the document 230 of monitoring objective is stored into the document data storage portion 63 as document revision information 241 of the latest revision number ("R3"). When the revision number is updated, in step S55, update information 250 is created from difference between the new and old document revision information (of "R2" and "R3") by the update information extraction portion 56.

Next, in step S56, the message generation portion 58 generates reference message ID 251 and message text 252 from the update information 250. In generation of reference message ID, for example, when the document 230 has been edited or updated lastly in the message tree where the document 230 is objective of editing and monitoring, used or created latest message (in FIG. 11, the message 202 on the message tree 200) is made as reference message. As created message text, for example, extraction of texts such as document identification information, document title, name of one who updates, and "addition", "correction", "deletion" and the like in the update information 250 is used.

Next, in step S57, the message synthesis portion 57 synthesizes insertion message from message text and update information and the like. In FIG. 11, by use of the document identification information 213, reference message ID 251, message text 252, and update information 250 of the existing created message 201, insertion message 260 is synthesized, which corresponds to that the message 204 is generated in the message tree 200.

Figure 11:
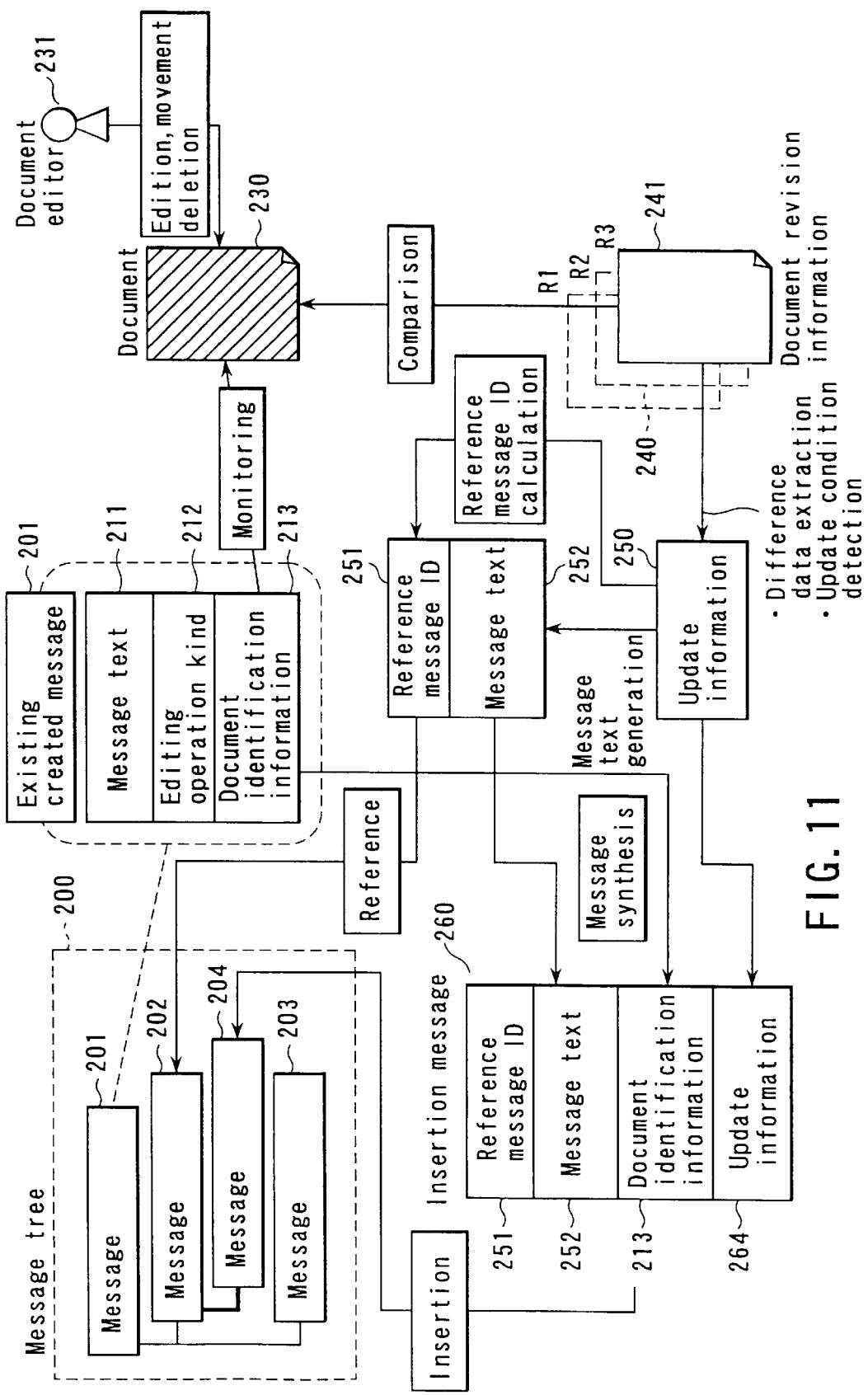
FIG. 11 is a diagram for explaining document monitoring processing actions.

In step S58, the message insertion portion 59 gives message ID to the insertion message 260, and stores it into the message data storage portion 62, as message corresponding to the message 204 that is child node of the message 202 on the message tree 200 in FIG. 11.

Finally, in step S59, at request from user, the message 204 is displayed as one of message groups whose replay relations are managed by the message tree 200 in FIG. 11.

FIG. 12 shows an example of a check table used for judging possibility of combination of document identification information and kinds of editing operation in the message analysis portion 52.

As document identification information, besides number issued on the basis of a specific rule in document management device, for example, URL of web page on Internet may be given. In the case of external documents to which such an URL is given, and when the document cannot be edited from the document management device, only document monitoring is enabled, and operations such as replacement or addition of document contents and the like are disabled.

According to the check table in FIG. 12, when the editing operation kind is "new creation", when there is not designation of document identification information, and when the same document identification information as document of editing and monitoring objective in another message tree than the message tree that can be identified by reference message ID included in created message, or existing document as external document is designated, document monitoring is enabled, especially in the latter case, if external document that cannot be edited from the document management device is designated, start of document monitoring by the document monitoring portion 55 is meant. When the editing operation kind is "replacement" or "addition", only when document identification information of document of editing and monitoring objective in message tree that can be identified by reference message ID included in created message, it is enabled. Further, when the editing operation kind is "deletion", only when document identification information of document of editing and monitoring objective in the same message tree as message tree that can be identified by reference message ID included in created message or another message is designated, it is enabled, especially, in the latter case, if external document that cannot be edited from the document management device is designated, end of document monitoring by the document monitoring portion 55 is meant.

Figure 13:
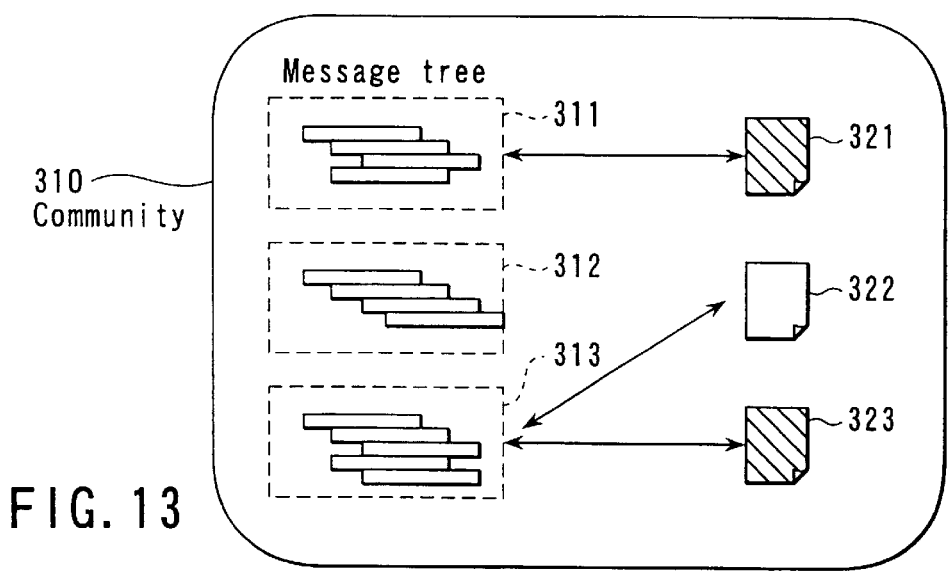
FIG. 13 is a diagram for explaining the relations between documents and message trees.

FIG. 13 is a diagram showing relations between documents and message trees. It is supposed that by exchanging messages among users as members of a certain group (community), 3 message tress 311, 312, and 313 have been created. In the case of the message tree 311, only the document 321 is the objective of editing and monitoring, and in the message tree 312, there is no document to become objective of editing and monitoring, and it is structured by only message texts. In the message tree 313, 2 documents, i.e., document 323 and document 322 are objectives of editing and monitoring. Not limited to the cases, for example, message tree 13 can edit and monitor the document 321 that is objective of editing and monitoring by the other message tree 311.

By designating document identification information in each message configuring message tree, document designated by the message tree may be objective of editing and monitoring, however, if this is permitted without limitation, history management of document editing and updates by the message tree, and the flow of discussions by the message text may be complicated. Therefore, it is prescribed that at most one document (as monitoring objective or as editing objective) should cope with in each message tree, thereby, it is possible to make clear the history management of transitions of document editing and updates by the message tree and the flow of discussions by the message text.

Next, the method to configure message tree in the message insertion portion 59 is explained hereinafter. As mentioned previously, there are the case when document is edited and updated by message, and the case when document is directly updated without message, and thereafter by document monitoring, message to correspond to the update is created. There are messages that do not include document editing operation, and are only message texts.

Figure 14A:
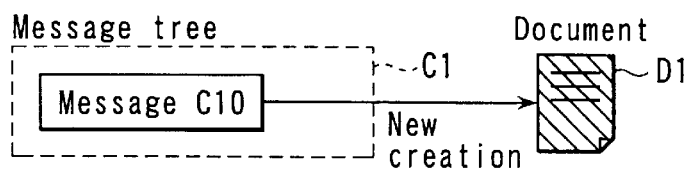
FIGS. 14A, 14B and 14C are diagrams for explaining structural methods of message trees.
Figure 14B:
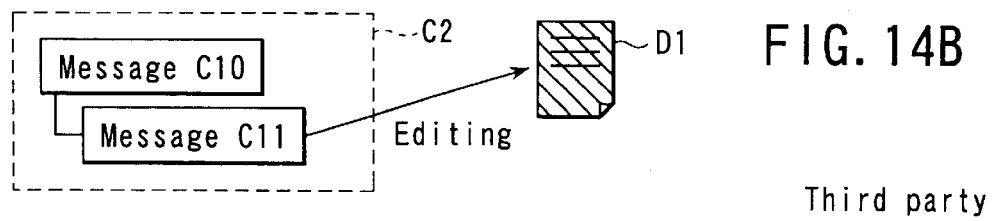
Figure 14C:
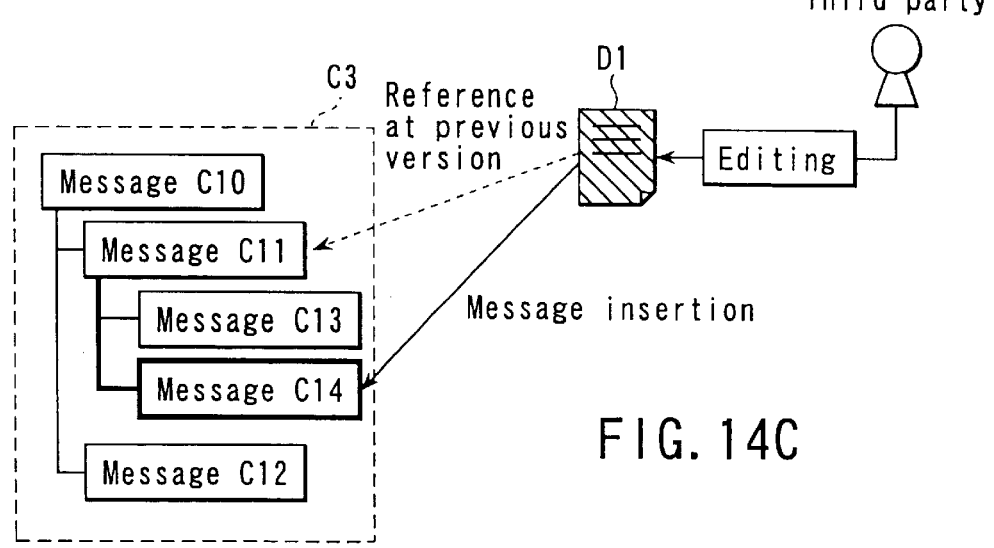

That is, as shown in FIG. 14A, when document D1 is newly created by creating message C10, message tree C1 is newly created. As shown in FIG. 14B, in the case where as reply to existing message C10, message C11 (with the message ID of the message C10 as reference message ID) is created, and the document D1 is edited by this message C11, the message C11 is made as child node leading to the message C11. Further, as shown FIG. 14C, when message C13 do not include document operation data, but is message created as reply to message C11 (wherein reference message ID is message ID of the message C11), it is made as child node leading to the message C11.

As mentioned above, when to edit document from message, user can determine message as reply, i.e., reference message ID, however, when to create message by document monitoring, it is necessary for the document management device to determine reference message ID. That is, in FIG. 14C, when document D1 is directly edited by a third party, this update is detected by the document monitoring portion 55, reference message ID of message C14 created as shown in FIG. 9, is made as message ID of the latest message (for example, message C11 herein) used or created, when document D1 has been edited or updated last in message tree where document D1 is editing and monitoring objective, and message C14 is made as child node leading to message C11 (reply to message C11).

As mentioned formerly, in the message data storage portion 62, for example, with respect to one document update, plural message groups in reply relations are managed and stored by message tree, but among message trees, there are some comprising only message texts not relating to document editing. In these message trees too, since they are linked by replay relations, it is supposed that some discussion may be processes in each message text. Therefore, it is useful to create one document by summarizing all or part of message texts that configure a certain message tree, or to create editing data corresponding to documents as editing objectives of the message tree.

Figure 15:
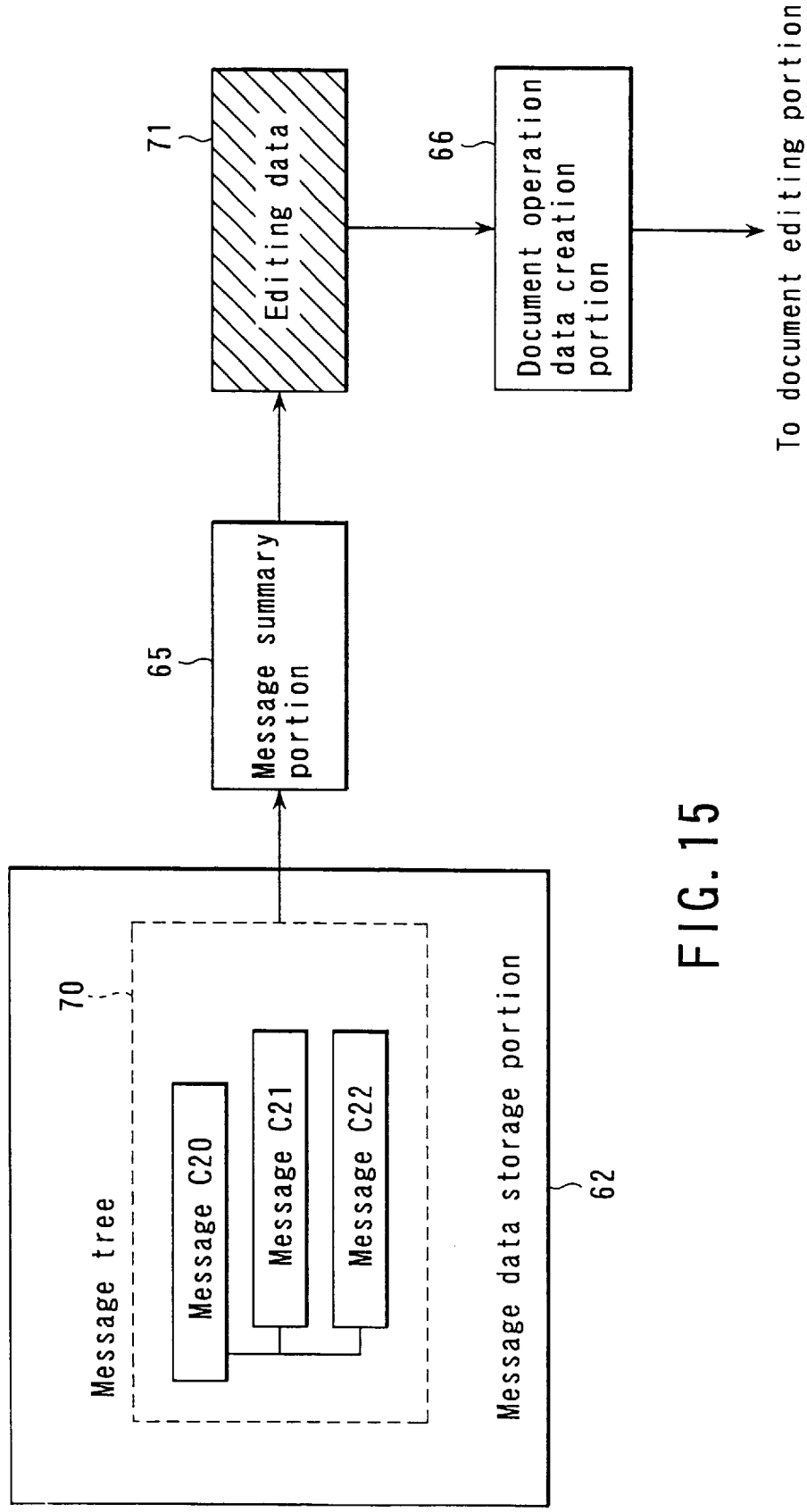
FIG. 15 is a diagram for explaining a structure of a document management device and processing actions thereof in the case of newly creating a document from all or part of messages configuring one message tree.

FIG. 15 is a diagram showing important portion of a structure of a document management device in such a case. Herein it is supposed that message tree 70 comprising only message texts, for example without document of editing objective, contained in the message data storage portion 62 is designated.

Comment text of each message (for insertion) that configures this message tree 70 is input to the message summary portion 65. In the message summary portion 62, process to summarize plural message texts into one document is carried out, for example, by use of an art disclosed in Japanese Patent Application KOKAI Publication No. 2000-112980. As a result, obtained document is sent to the document editing data creation portion 66. In the document editing data creation portion 66, document sent from the message summary portion 65 is handled as editing data, and to this editing data, "new creation" as the kind of editing operation is given, and document editing data for sending it to the document editing portion 53 is created, and the created document editing data is transferred to the document editing portion 53. The processing after this is same as mentioned previously.

As described heretofore, when messages (including messages including document editing data) are posted (registered) from members of community per community, if there are newly created, updated documents based on such messages, such documents are registered as document revision information too, as a result, it is possible to correspond messages and documents (including newly created documents, updated documents) and thereby manage them, and also to manage transitions of discussions by message by message tree.

Documents to be managed as document revision information (newly created documents, updated documents) are always corresponded to messages, while, some of messages do not include document operation data, therefore they may be not corresponded to documents.

(3) Comment, Document, Shared Information Management Data, Community Information, User Information An example of messages accumulated in the message accumulation potion 9 and documents accumulated in the document accumulation portion 10 (document revision information) as mentioned above is shown in FIG. 16 and FIG. 17.

In FIG. 16, to message 500, message ID 501 for identifying the message is given, and the message 500 comprises header information such as message title, user ID of user who has created thereof, date and time of creation, community ID of posted message, and the like, and main body information such as text as message text, document identification information of document edited, created by the message (herein, for example, file name, URL), reference message ID of the message, and the like.

In FIG. 17, document (concretely, document revision information) 520 has document identification information 521 for identifying the document, and consists of header information such as document title, editor of the document, date and time of editing, community ID of the document, revision number and the like, and main body information such as document text and the like.

FIG. 18 is a diagram showing an example of control data of shared information to be accumulated in an information management portion 11. This management data 540 relates to, for example, one document to be identified by document identification information, and corresponds and manages community ID of the community to which the document belongs (where the document is shared information), and message ID of messages related to creation, editing and update of the document (message ID of messages that configure message tree). Further, in the management data 540, publication scope such as whether the document can be made public only to members in community to which the document belongs, in the scope of users to which the document can be made public, or, whether the document can be made public to other users or not is corresponded and managed.

In the management data 540, the document publication scope is "within community", which shows that this document may be made public only to the community where this document has been created (to which the document belongs). Besides this setting, fine settings such as "may be made public to all communities", "may be made public to only specified community" and the like may be made.

FIG. 19 is a diagram showing an example of community information to be accumulated in a community information accumulation portion 8. Community information is to manage each of plural communities, and as shown in community information 560 in FIG. 19, it manages each community by community ID 561 as identification information to identify each community, name of the community, user identification information (manager ID) as manager, date and time of community creation, publicity degree of community, user ID of user as member of the community, publicity degree of message as shared information of the community to outside, document identification information of document created and updated in the community (shared information of the community), and log file name to accumulate community use history (for example, manager log information to be described later herein) and the like.

In the community information 560, the publicity degree of community appears as "membership system". This means that "the existence of the community is made public to outside users, but only users permitted as members of the community by manager can post messages to the community." Besides this, as publicity degree, "non public" that means "the existence of the community is not made public to outside", "public" that means accessible for all users, "public to organization" that means "users belonging to an organization can access" and the like may be set.

By the way, as in the community information 560 in FIG. 19, with respect to community of "membership system", a list of user ID of users participating in the community by posting current message is described in an attribute called "member". In the case of community of "public", when a certain user posts message or document to the community, he becomes a member of the community, therefore, user ID of the user is added to the attribute "member" every time.

FIG. 20 is a diagram showing an example of user information to be accumulated in a user information accumulation portion 5. The user information is for managing all the users in information shared system. In FIG. 20, user information 600 comprises user ID 601 for identifying each of all users in information shared system, name and belonging of the user, mail address, log file name for accumulating personal system use history and the like.

(4) Screen Display Examples

Figure 21:
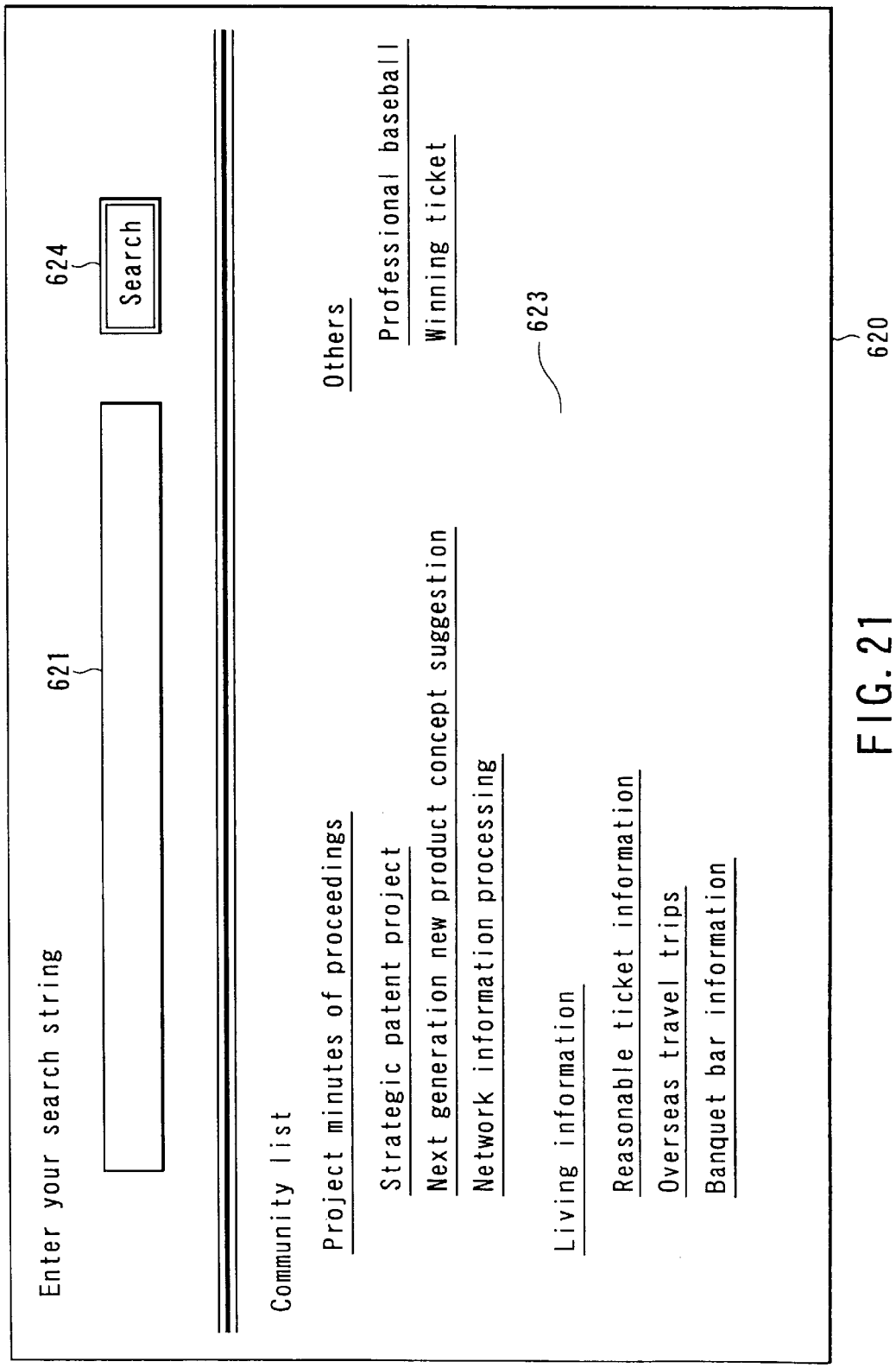
FIG. 21 is a view showing a display example of an information search screen.

FIG. 21 is a view showing a display example of an information search screen provided from the input and output portion 7 to the user terminal 40, and shows an display example at the user terminal 40.

In FIG. 21, an information search screen 620 is for searching for shared information (herein, only documents) to meet user requirements and communities, on the basis of search string input in a search string input area 621. As shown in FIG. 21, the information search screen 620 comprises the search string input area 621, a search execution instruction button (search button) 624, and a display area 623 of list of communities made public among existing communities in the information shared system.

When a user inputs a desired search string into the search string input area 621, and presses the search button 624, the server device 1 starts searching, and searches for documents similar to the search string, and displays the results of search on the user terminal 40 from which request has come. It also searches for and displays communities where discussions of a field similar to the search string are being carried out.

By the way, documents managed as shared information in each community are, in principle, public documents that may be made public also to members of other communities.

The list of communities displayed in the display area 623 is displayed in classification into some categories (in FIG. 21, "project minutes of proceedings", "living information", and "miscellaneous"), however, the display method of the list is not specially limited herein.

FIG. 22 is a view showing a display example of a search result display screen provided from the input and output portion 7 to the user terminal 40, and shows a display example at the user terminal 40.

In FIG. 22, the search result display screen 640 shows the search result when a natural language search string is input to the search string input area 621 in the information search screen 620 in FIG. 21 and search has been executed.

The search string input display area 641 of the search result display screen 640 shows a search string that is input by a user to the search string input area 621 of the information search screen 620 in FIG. 21, while, looking at this search result display screen 640, if user wants to carry out search once again by adding correction to the search string, user may input a new search string once again to this search string input display area 641, and press the search button 644.

In the search result display screen 640, as search result, for example, a list 642 of communities similar to the input search string and a list 643 of documents similar to the input search string are displayed.

Figure 23:
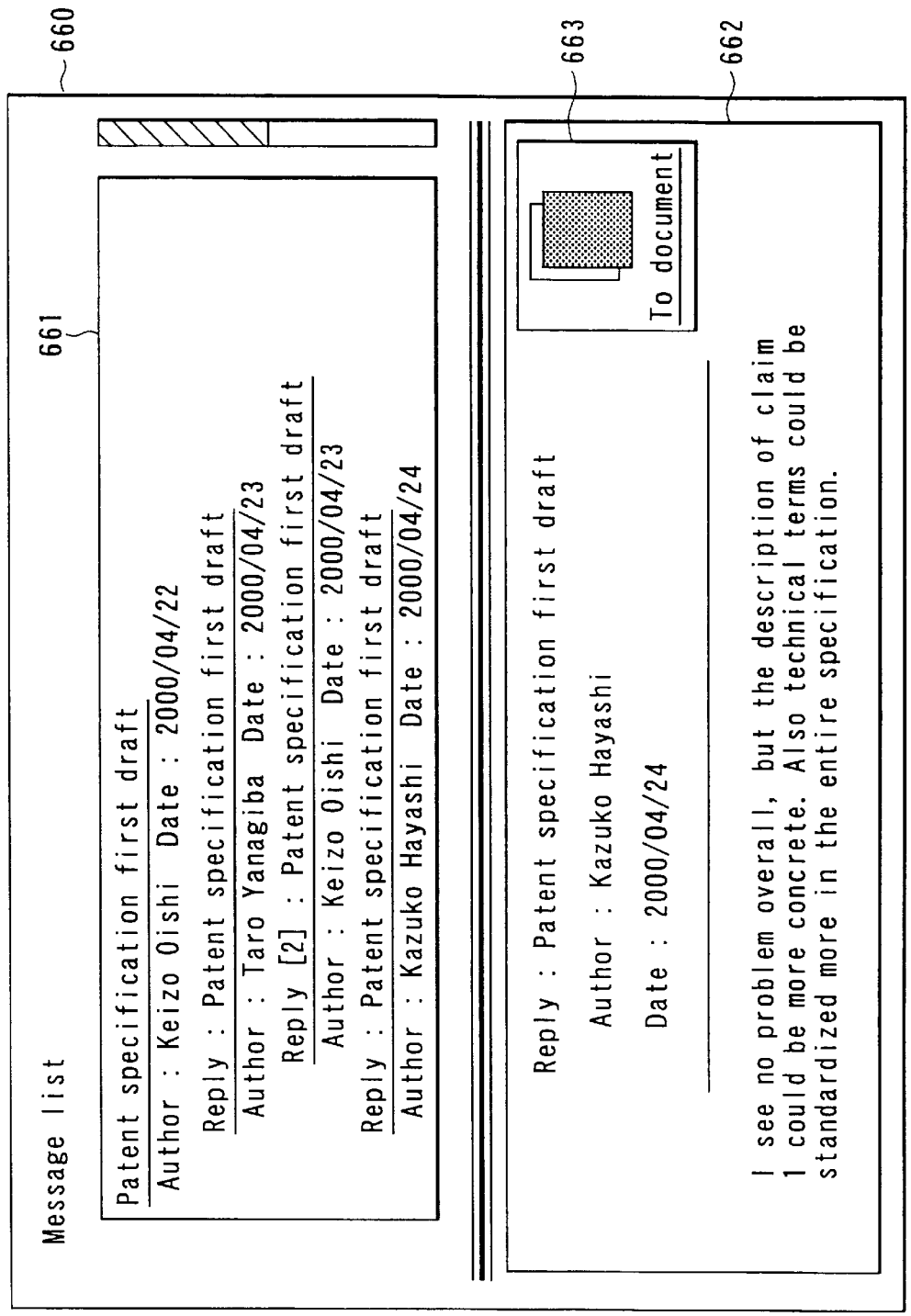
FIG. 23 is a view showing a display example of a display screen to display a message.

For example, when a desired community is selected from the list 642 of communities as the search result displayed in the search result display screen 640 in FIG. 22, if this user is a member of the selected community, a display screen 660 as shown in FIG. 23 is provided from the input and output portion 7, and at the same time, the list of messages in the selected community is displayed on a display area 661.

The display area 661 of the display screen 660 in FIG. 23 is output in response to request to browse especially messages among shared information in a desired community, and the list of messages in a community, for example, "strategic patent project" is displayed in message tree style.

When a desired message is selected from the message tree displayed on the display area 661, the selected message is displayed on a display area 662 of the display screen 660. In FIG. 23, it is shown that the message with title "reply: patent specification first draft" that has been selected from the message tree displayed in the display area 661 is displayed on a display area 663. When to display message, this message text is mainly displayed. By the way, when there are documents related to the displayed message, links to such documents are displayed. In FIG. 23, when the link display portion 663 is selected by a mouse or so, as shown in FIG. 24, a display screen 680 is provided from the input and output portion 71, and at the same time, the documents are displayed on a display area 681.

Figure 24:
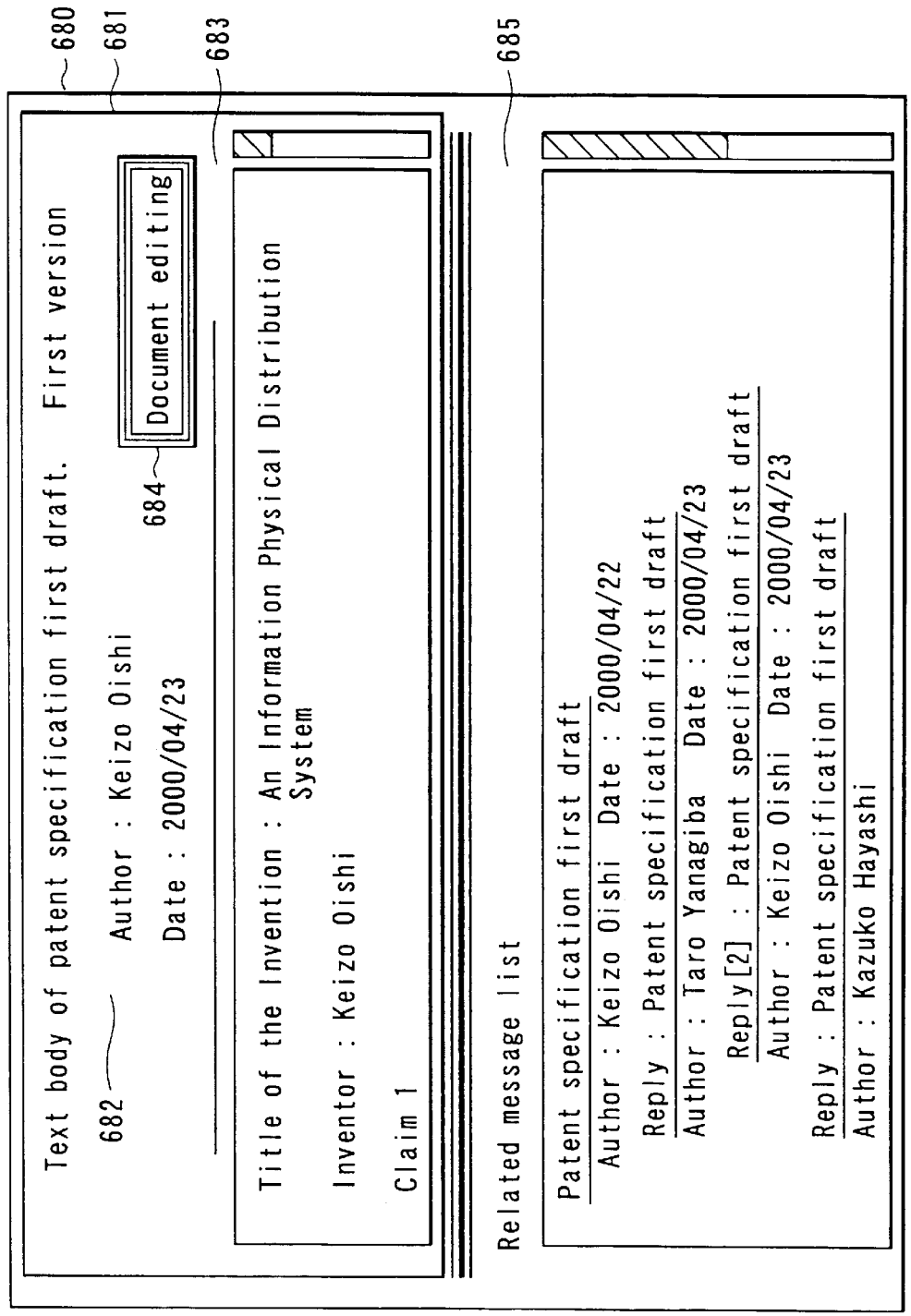
FIG. 24 is a view showing a display example of a display screen to display a document.

The display area 681 of the display screen 680 in FIG. 24 is output in response to request for user to browse especially documents among shared information in community, and header information 682 including the title of the document, editor of the document, date and time of editing, community ID of the document, revision number, publicity scope of the document and the like, and document text 683 is displayed.

In the display screen 680 in FIG. 24, further in a display area 685, the list of messages relating to creation, edition, update of document displayed on the display area 683 is displayed in message tree style. Thereby, it is possible for the user who browses the document displayed on the display area 685 to browse in what transition the document has been created.

By the way, users who can browse the display screen showing the list of messages and documents as shown in FIG. 23 and FIG. 24 are, in principle, members of the community where the messages and documents are registered.

FIG. 25 is a view showing a display example of a message registration screen that is provided from the input and output portion 7 to the user terminal 40, and shows the display example on the user terminal 40.

Herein a message registration screen is shown wherein user creates (newly creates) a new document summarizing message texts of plural messages configuring message tree and registers it.

A message registration screen shown in FIG. 25 mainly comprises a message text input area 701, a document text input area 702, and a message display area 703.

In a message registration screen 700 in FIG. 25, first, user selects message tree to be processing objective, and make it displayed on the message display area 703. In this message display area 703, not only message tree but also contents (at least message texts) of messages selected from the message tree are displayed. In reference to the contents of the messages displayed on this message display area 703, user inputs text body of document into the document text input area 702. The message text input area 701 is, for example, message text concerning document created, and used for creating message to notify members of community of creation of document.

Document may summarized manually and created, in reference to existing messages as mentioned above, while, when there are many message to refer to, summarizing manually may be complicated. In this case, by use of, for example, such an art as disclosed in Japanese Patent Application KOKAI Publication No. 2000-112980, it is possible to summarize plural message texts into one document. For this purpose, the document message registration screen 700 is equipped with an instruction button (auto summary button) 704 for automatically summarize message texts in messages configuring the message tree displayed and selected on the message display area 703. By pressing this button 704, in the community information management portion 2, by the structure shown in FIG. 15, it is available to automatically create a summary of selected messages. The document created after automatic summary is displayed on the document display area 702.

The message registration screen shown in FIG. 25 is used for not only creating document summarizing messages displayed on the message display area 703, but also creating message as reply to message displayed on the message display area 703, and also for creating and updating document corresponding to message. That is, message is input to the message text input area 701, and document operation data is input to the document text input area 702, and a posting destination search button 706 is selected by a mouse or the like, communities as posting destination of input message are searched. A desired one is selected among the list of communities displayed as result of search of posting destination, and specific operation is carried out, thereby the message input to this message registration screen 700 is posted to the selected community.

Figure 34:
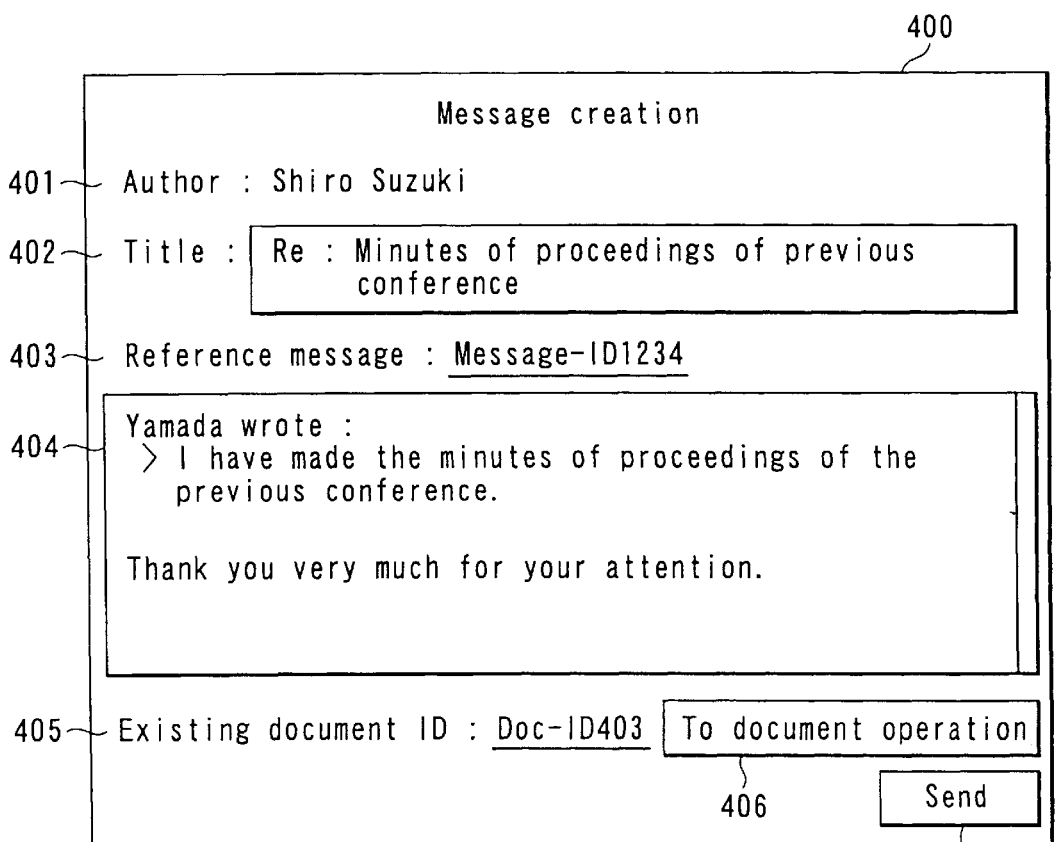
FIG. 34 is a view showing another example of a message registration screen.

FIG. 34 is a view showing another example of a message registration screen, and is a message creation screen 400 for creating reply message to existing messages (insertion messages) not including especially document operation data. In FIG. 34, in input areas 402, 403 and 404, titles as replay message, reference message ID, and message text are input, and in this status, when the send button 410 is pressed, input data of this message creation screen is input as created message to the input portion 11, and the processes after step S32 in FIG. 7 are carried out.

On the other hand, in the status shown in FIG. 34, when the button 406 displayed as "to document operation" is pressed, message creation screen accompanying document operation data as shown in FIG. 35 can be started.

FIG. 35 is a view showing still another example of a message registration screen 420 for creating message accompanying document operation. Besides input to the input areas shown in FIG. 34, document identification information (document ID) as editing objective, editing operation kind, and editing data are input to the input areas 422, 425, and 423. At the moment when editing operation kind is input to the input area 425, the list of editing operation kinds ("new creation", "addition", "replacement", and "deletion") are displayed in pull down menu style, and one selected among them is displayed on the input area 425.

On the message registration screen shown in FIG. 35, for example, reference message ID, message text, document identification information to be editing objective, editing operation kind, and editing data are input, and the send button 428 is pressed, then the input data of this message registration screen is input as created message to the message input portion 51 via the input and output portion 7, and the processes after step S43 in FIG. 8 are carried out.

By the way, in FIG. 25, FIG. 34, and FIG. 35, areas to input community ID and user ID are not displayed, however, input areas for community ID and user ID may be included, or may be added automatically.

As mentioned heretofore, some screen display examples to be displayed on the user terminal 40 have been explained, however, the screens are not limited to the cases mentioned so far. Especially, in the message registration screen, any screen may be used, only when it enables to register message including document operation data for editing and updating document, or message of only message text to each community, to manage transitions of discussions by exchanges of messages by message tree per community, and to input information necessary for corresponding and managing documents (including updated documents) created, edited, or updated by messages on the message tree to the message.

(5) Search of Communities

In reference to the flow chart shown in FIG. 26, the processing actions of the Inter-community information management portion 3 to search for communities similar to search request input by users the processing actions to search for communities suitable for messages (or messages and documents) created by users will be explained hereinafter.

Community search request is sent to the server device 1 when the search screen 62 shown in FIG. 21 is displayed, and search string is input in the search string input area 621 of this search screen 620, and the search button 624 is pressed, and when the document message registration screen 700 shown in FIG. 25 is displayed on the user terminal 40, and message and document is input into this screen 700 (or when input is made by selecting existing (for example, already posted to any community) message and document), and the posting destination search button 706 is pressed. In search request in the former case, at least user ID and search string are included, while, in search request in the latter case, at least user ID and input message text and document text (hereinafter, message text and document text included in search request are referred to as search texts) are included.

The search string that is input to the search string input area 621 of the search screen 620 is a string wherein sentence of natural language or a word or plural words, or plural words combined by logic operators (AND, OR), and the like.

This search request (of community) is sent via the information search and presenting portion 4 to the Inter-community information management portion 3. The Inter-community information management portion 3, first, transfers search string, search sentence to the community information management portion 2, and then searches for messages and documents similar to these to all the shared information of all the communities, and as a result, it creates a set of messages M0 and a set of documents G0 (steps S301 and S302).

By the way, in searching for messages and documents similar to search string and search sentence, for example, the art of "document search device" disclosed in Japanese Patent Application KOKAI Publication No. 6-231178 may be employed. That is, morpheme analysis, construction analysis, and semantic analysis of search string and search sentence included in search request are carried out, and meaningful related words from words extracted as the result are combined by use of logic operators, and thereby new search string is created. With respect to each of all the documents and messages managed as shared information per community, on the basis of morpheme analysis, construction analysis, and semantic analysis in the same manners as the, the number of character strings to match (meet) the newly created search string, or the number of sets of character strings is obtained from documents and messages, and documents and messages of over the threshold value at which the number has been preset are extracted as document and messages similar to search string and search sentence included in the search string. For making explanations easier, the number of character strings or sets of character strings to match the new search string is set as the value of similarity of documents and messages. By the way, the present invention does not intend to make a special limit to the method to search messages and documents similar search string.

Next, the Inter-community information management portion 3 receives the set of messages M0 and the set of documents G0 extracted as search results from the community information management portion 2, and then sorts them per community, and male the total of similarities of messages and documents collected per community the similarity of community (step S303). It generates a set of communities P where communities are placed in the order of similarity (step S304).

By the way, in the explanation, in the similarity calculations for searching communities similar to search string and search sentence, similarity has been obtained by accumulating similarities of documents and messages similar to the search string and search sentence belonging to the community, however, the method is not limited to this, and there may be a method, for example, wherein word vector space of community is indexed in advance from messages, and similarity is calculated from the index. By the way, the present invention does not intend to make a special limit to the method to obtain the similarity of community.

To elements whose similarities are larger than a threshold value TH among the elements of the set of communities P, the following processing is carried out (steps S306 and S307). When the similarity of an element Pi of the i-th of P is larger than the threshold value TH, it is recorded to manager log information LPi of community Pi that search request including search string similar to the community, search sentence, and user ID has been input (step S308). That is, at least, search string, search sentence, and user ID are recorded as the history of the search request.

If the community Pi is a public community, or a membership community to which the user who has made the search request belongs, the community Pi is added to search results Q (steps S309 and S310).

If the community Pi is a membership community, and the user who has made the search request does not belong to the community, the user ID of the user is added to he member candidate list UPi of the community Pi (steps S311 and S312).

The set of communities Q as the search result created by search processing on all the communities as shown above is sent to the information search and presenting portion 4. For example, when search request is carried out from the search screen in FIG. 21, the information search and presenting portion 4 can display the list of communities 642 in the order of higher similarity to search string and search sentence, as shown in the search result screen 640 in FIG. 22.

When search request is carried out from the message registration screen in FIG. 25, the set of communities Q suitable for posting messages and documents created on this screen is displayed on the community search result display screen 720 as shown in FIG. 27. Of course, communities are displayed in the order of higher similarity to search sentence, i.e., created messages and documents. User selects a desired one among the list of communities, and selects the registration button 721 by a mouse or so, thereby the message input to this message registration screen 700 (message not including document operation data, or message including document operation data) is posted to the selected community.

Figure 26:
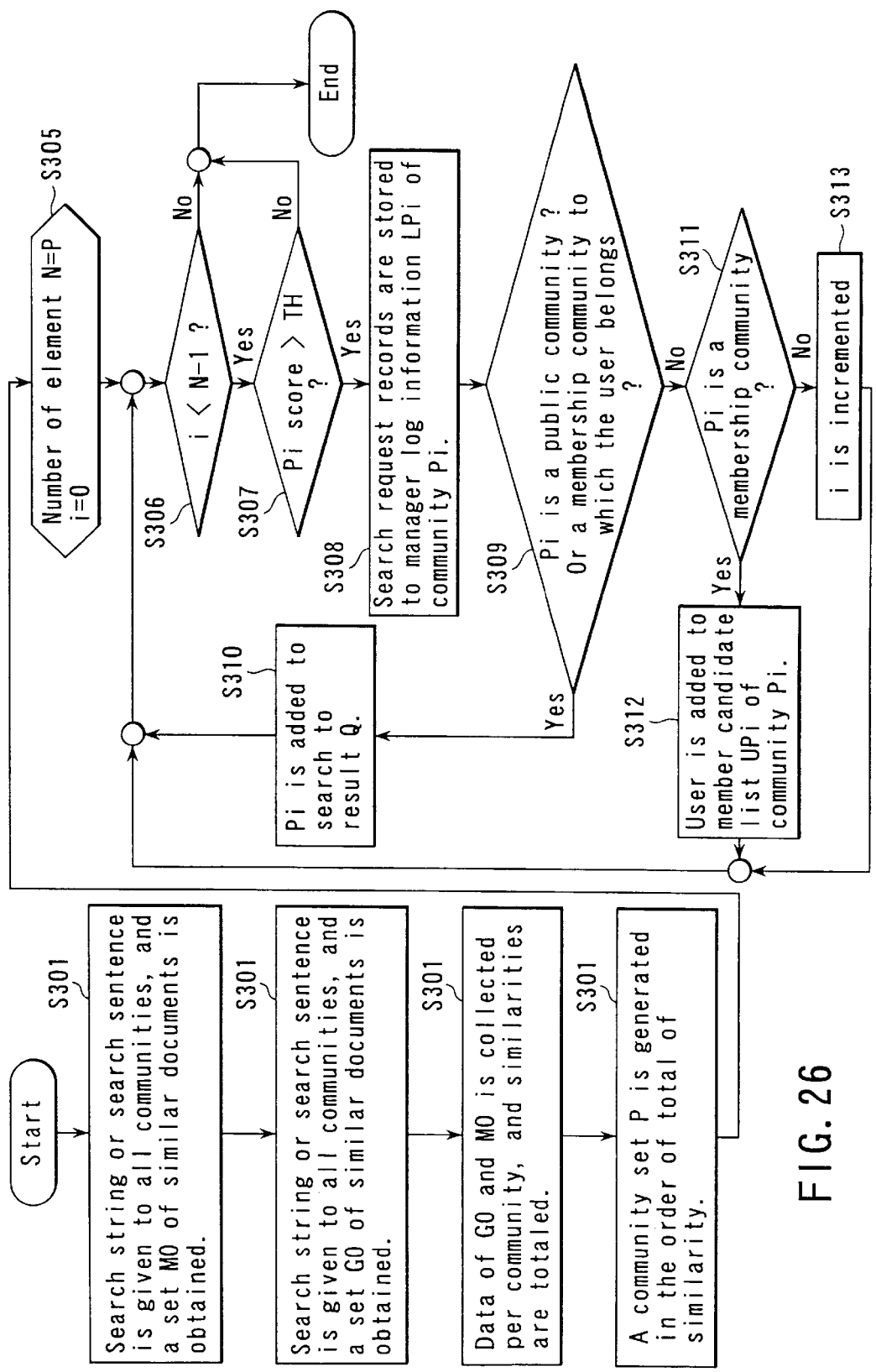
FIG. 26 is a flow chart for explaining community search processing actions.

By selecting a desired community from the community list display area 623 of the search screen 620 shown in FIG. 21, or by selecting a desired community from the community list 642 of the search result display screen 640 shown in FIG. 22, user gets in a status of access to the selected community, that is, he gets in the selected community, and in this status too, it is available to carry out search of communities as shown in FIG. 26 by conducting a specified operation. In this case, when the community to which the user belongs is included in the set Q of communities obtained as the search results, the information search and presenting portion 4 displays communities by excluding the community from the set Q of communities.

Now, as the result of the processing shown in FIG. 26, when a certain community Pi is a membership community, and further, when the member candidate list UPi is not empty, it can be judged that a user u belonging to UPi, though he is not a member of the current community, he is a user able to carry out search request relating to the contents discussed in the community Pi, and post (register) messages and documents relating to the contents discussed in the community Pi in other community. In such a case, promotion activities are available for the Inter-community information management portion 3 to notify (introduce) the existence of the user u to the manager of the community Pi, and in response to this, for the manager to send introduction message to the user u, and the like.

Figure 28:
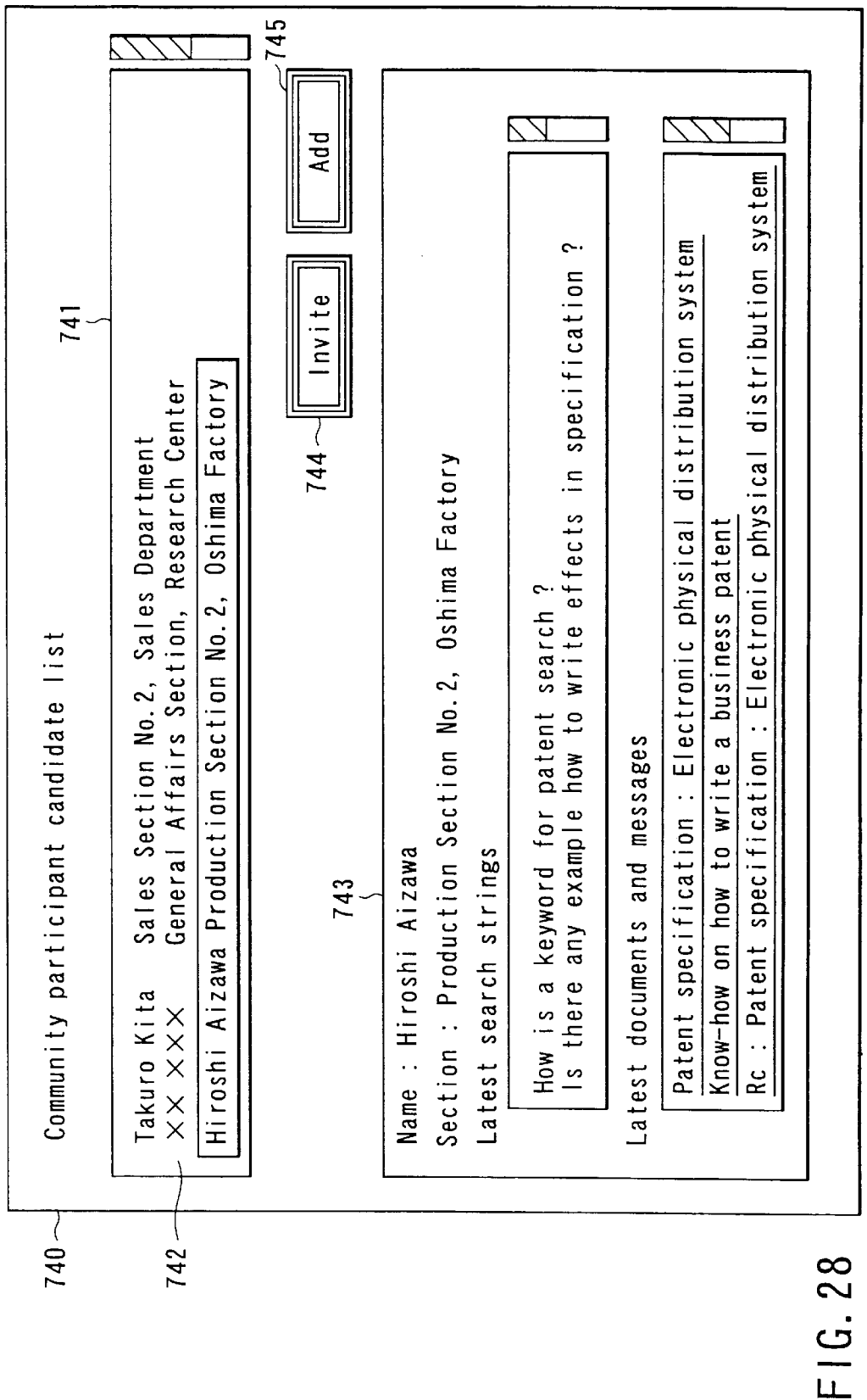
FIG. 28 is a view showing a display example for informing a manager of a non-public community or a membership community of existence of a user as a candidate participating in the community.

FIG. 28 is an example of screens provided from the input and output portion 7 to the user terminal 40 at the manager for notifying to manager of non public community or membership community the existence of the user as a participating candidate to the community.

In FIG. 28, in this display screen 740, a list 741 of user whom the Inter-community information management portion 3 has judged appropriate to take part in the community is displayed, and a display area 743 of search string, document and message relating (at the moment of when the community is selected) to the community of the user selected on this user list 741, and buttons 744 and 745 for instructing to invite the user selected from the list 742 and adding user forcibly to members are arranged.

By the way, in a display screen 749, part of the information listed in the user information accumulated in the user accumulation portion 5 is displayed on the list 742, however, for some reason (for example, when the user denies his personal information being made public, and the like), as shown in FIG. 28, part of information may be hidden.

The Inter-community information management portion 3 may analyze the manager log information LPi of a certain community Pi, and detect that many search requests similar to the contents discussed in the community Pi (search request data including search string, message, and document) are input. When there is not any document that can be presented as an answer to the set of these search requests in the community Pi (when there is not document having community ID of the community in the document accumulation portion 10 of the community information management portion 2, there is such a document, but when it is non public to other users than members of the community), the Inter-community information management portion 3 may send a message to urge the manager of the community or the whole members to register a document to be an answer to the set of the search requests, or to make document public.

The Inter-community information management portion 3 may analyze the manager log information LPi of the community Pi, and detect that many shared information (messages and documents) similar to the contents discussed in the community Pi are registered in other communities.

For example, when search request has already been made with existing messages and documents posted (registered) in a certain community, since the history of the search request has been recorded in the log information LPi (for example, in messages and documents included in search request, as shown in FIG. 16 and FIG. 17, community ID of registration destination is described in header information, therefore, by referring thereto), other communities whose contents of discussions are similar may be detected in easy manner. In such a case, the Inter-community information management portion 3 may send a message to respective managers of communities which are similar to the effect that the contents of discussions of communities are similar.

Further, when many search requests (more than the prescribed number) of the identical user u are recorded in the manager log information LPi of a certain community Pi, the Inter-community information management portion 3 may send to the manager of the community Pi a message to tell that the user u already exists. In response thereof, the manager may take measures to invite this user u to the community Pi.

(6) Search of Shared Information

In reference to the flow chart shown in FIG. 29, the search processing actions of the community information management portion 2 will be explained hereinafter.

First, the case is explained wherein a user selects a certain community, and search for shared information in status connecting to the community. When this user is a member of the community, all the shared information of the community can be presented, while, when the user is not a member of the community, in principle, only documents can be presented. By the way, shared information (messages and documents) of each community is designated whether to not to be presented to members of other communities (by management data of shared information as shown, for example, in FIG. 18), documents may not be presented to users of other community.

By selecting a desired community from the community list display area 623 of the search screen 620 in FIG. 21, or by selecting a desired community from the community list 642 of the search result display screen 640 shown in FIG. 22, displayed on the user terminal 40, user gets in the community, and then carries out a specified operation from the user terminal 40, thereby, a search screen including at least search string input area and search execution instruction button, for example, as shown in FIG. 21, is provided from the input and output portion 7. When search request including search string input into the search string input area of this search screen is sent to the input and output portion 7 of the server device 1, this search request is transferred via the information search and presenting portion 4 to the community information management portion 2. This search request includes the user ID of the user who has issued this search request. It is supposed that a natural sentence, for example, "Is there any example of patent publication?" is input as search string.

First, the information presenting portion 12 of the community information management portion 2 searches for messages and documents similar to search string among messages accumulated in the message accumulation portion 9 and documents accumulated in the document accumulation portion 10, and generates a message set M1 and a document set G1 (steps S201 and S202). By the way, with respect to the method to search for messages and documents similar to search string, the art of "document search device" disclosed in the Japanese Patent Application KOKAI Publication No. 6-231178 mentioned previously may be employed. In search herein, for example, in reference to the management data of shared information as shown in FIG.

18, only shared information of the community that the user currently selects is searched.

The messages and documents listed respectively in the message set M1 and the document set G1, as shown in FIG. 16 and FIG. 17, include community ID of the community to which they belong in header information. The community information accumulated in the community information accumulation portion 8, as shown in FIG. 19, includes user ID of user as member of the community, per community. Therefore, the information presenting portion 12 receives the community information from the Inter-community information management portion 3, and checks whether the user ID of search request is listed as a member of the community in the community information. If it is listed therein, it is judged the user who has carried out search request is a member of the community, while, if it is not listed there, it is judged that the user is not a member of the community.

When the user who has carried out search request is not a member of the community, in principle, only documents can be presented to the user. Therefore, the processing is carried out only on the document set D1. First, the shared information management portion 2, in reference to the management data shown in FIG. 18, removes documents whose publication is not permitted to outside of the community from the document set G1 (step S204). To this result, when there is document with different revision number in same document identification information, a document set G2 comprising only document of the latest revision number is created (step S205). Search result list L becomes a set G2 (step S206).

When the user who has carried out search request is a member of the community, in principle, both documents and messages can be presented to the user. Accordingly, among the message set M1 generated at the step S201, those which have reference relations in messages (message tree) are collected into one element, and made into a set M2 (step S207). Next, to the document set G1 as the result of the step S202, with respect to documents with different revision numbers in same document identification information, only documents of the latest revision numbers are collected, and a document set G2 is created (step S208). Next, the information management portion 11, in reference to the management data shown in FIG. 18, generates a message set M3 wherein those related to the document set G2 are removed from the message set M1 as the result of the step S201, on the basis of relations between messages and documents (step S209). The total of G2 and M3 is made as search result list L of shared information (step S210). This search result list L is displayed on, for example, the search result display screen as shown in FIG. 22.

Figure 29:
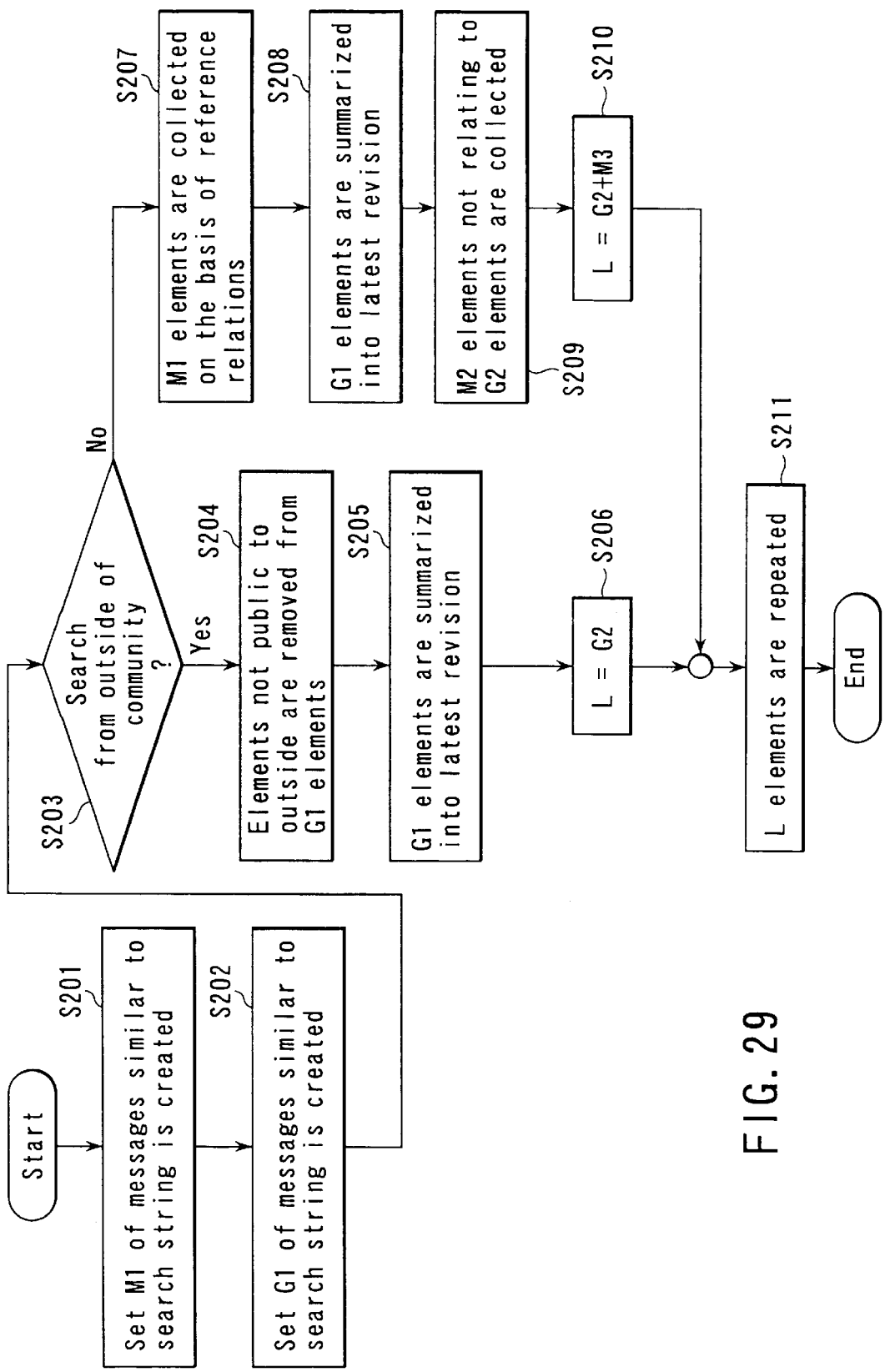
FIG. 29 is a flow chart for explaining shared information search processing actions.

The flow chart in FIG. 29 shows the case when user selects a certain community, and in status getting in the community, searches for shared information, and as a result, search processing in the shared information of the community. On the other hand, when a user searches for shared information before selecting a community, the search objective becomes the whole shared information of all communities.

After a desired search string is input into the search string input area 621 of the search screen 620 in FIG. 21, displayed on the user terminal 40, the search button 624 is pressed, thereby, search request including at least this search string is sent to the input and output portion 7 of the server device 1. This research string is sent via the information search and presenting portion 4 to the community information control portion 2. This search request includes the user ID of the user who has issued the search request. The processes thereafter are same as those in FIG. 29, but (since the processes in FIG. 29 are for one community), in this case, search processes shown in FIG. 29 are executed to the shared information of the community, per each community. By the way, in the step S203, since the user who has carried out the search request does not select the current community, in the step S203, the research request is treated as search request outside of the community, and the processes in steps S204 through S206 are carried out. That is, in each community, only public documents that may be made public to others than the members of the community are presented. In the step S206, the Inter-community information management portion 3 combines all the set G1 per community (for example, obtains a logic sum thereof), and in each community, creates a collection of documents that may be made public to outside, and makes it as the search result list L, and sends back the result via the information search and presenting portion 4 to the user. Through these processes, it is possible to display, for example, the document list 653 in the search result display screen 640 in FIG. 22.

(7) Search of Shared Information Similar among Different Communities

The community information management portion 2 searches for shared information similar among different communities, by use of shared information (messages and documents) per community accumulated in the message accumulation portion 9 and the document accumulation portion 10. This search may be carried out, for example, periodically, or at instruction from manager of the server device 1.

With regard to the method to obtain similarity among shared information, in the same manner as mentioned previously, for example, the art of "document search device" disclosed in Japanese Patent Application KOKAI Publication No. 6-231178 may be employed. That is, when to search for shared information similar to shared information (messages and documents) registered in a certain community from other communities, first, morpheme analysis, construction analysis, and semantic analysis of shared information (messages and documents) as search key are carried out, and meaningful related words from words extracted as the result are combined by use of logic operators, and thereby new search string is created. From all the shared information of other all communities, shared information wherein the number of character strings to match this created search string is over a specified value may be extracted.

Each of shared information similar to each other existing in different communities is added header information as shown in FIG. 16 and FIG. 17. In reference to this header information, search results are analyzed, thereby it is possible to make a notice as shown below to user. Herein, to make explanations simple, one of plural communities is called community A, and another community different from this community A is called community B.

Since it is possible to detect plural different communities where there are (preferably a plurality of) shared information similar to each other, the existence of other communities where similar shared information is registered to each member (at least manager of each community) of respective communities.

For example, when it is detected that document similar to shared information of the community A is registered in the community B, especially, when plural shared information pieces are similar to each other, it is considered that these two communities are similar communities where similar discussions are made, the notice that the community A and the community B are similar to each other is made to respective members of the communities A and B (at least manager of the community A). The notice of the existence of document (registered in the community B) similar to the shared information registered in the community A is sent to respective members of communities A and B (at least manager of the community A). In turn, the notice of the existence of document (registered in the community A) similar to the shared information registered in the community B is sent to respective members of the community B (at least manager of the community B).

When it is detected that shared information similar to shared information (one piece or plural pieces) that a user "a" as a member of the community A has registered to the community A is registered in the community B, the existence of the community B is notified to the user "a".

When it is detected that shared information similar to shared information (one piece or plural pieces) that a user "a" as a member of the community A has registered to the community A is registered in the community B, the existence of the user "a" is notified to at least the manager of the community A.

For conducting such notices as mentioned above to user, a specified notice screen may be provided from the input and output portion 7 to each user terminal 40.

Besides the shared information (messages and documents) per community accumulated in the message accumulation portion 9 and the document accumulation portion 10, manager log information explained in FIG. 26 may be also used.

(8) Presenting Comments to Users out of Community, and Making Them Participating in Community Temporarily In a certain community, in principle, messages are not presented but only documents are presented in response to search request from users who are not members of the community (who have not yet participated in discussions in the community). However, this principle is observed strictly, there is a possibility that discussions in the community may be staggered. Accordingly, when a community manager permits, in response to search request from a specified user who is not a member of the community, in presenting documents of the community, at least, all or part of message trees corresponded to the presented documents are also presented at the same time.

That is, for example, the display screen shown in FIG. 24 that is provided only to members of the community A may be provided also to user b who is not a member of the community A. By the way, in this case, on the display area 685 of the display screen in FIG. 24, only the contents of messages permitted by community manager are displayed. When a user b who has browsed such a display screen carries out a specified operation, the message registration screen is displayed. The message registration screen mainly comprises message text input area, and cannot create editing data or document. A message that is input to this message registration screen is posted to the community A as a reply to, for example, the message displayed in the display area 685 of the display screen in FIG. 24. This posted message may be presented to all the members of the community A, therefore, some members may register reply messages in response to the message. It is preferable that this reply message is presented unconditionally to this user b, at request from the user b.

[Second Embodiment]

Figure 30:
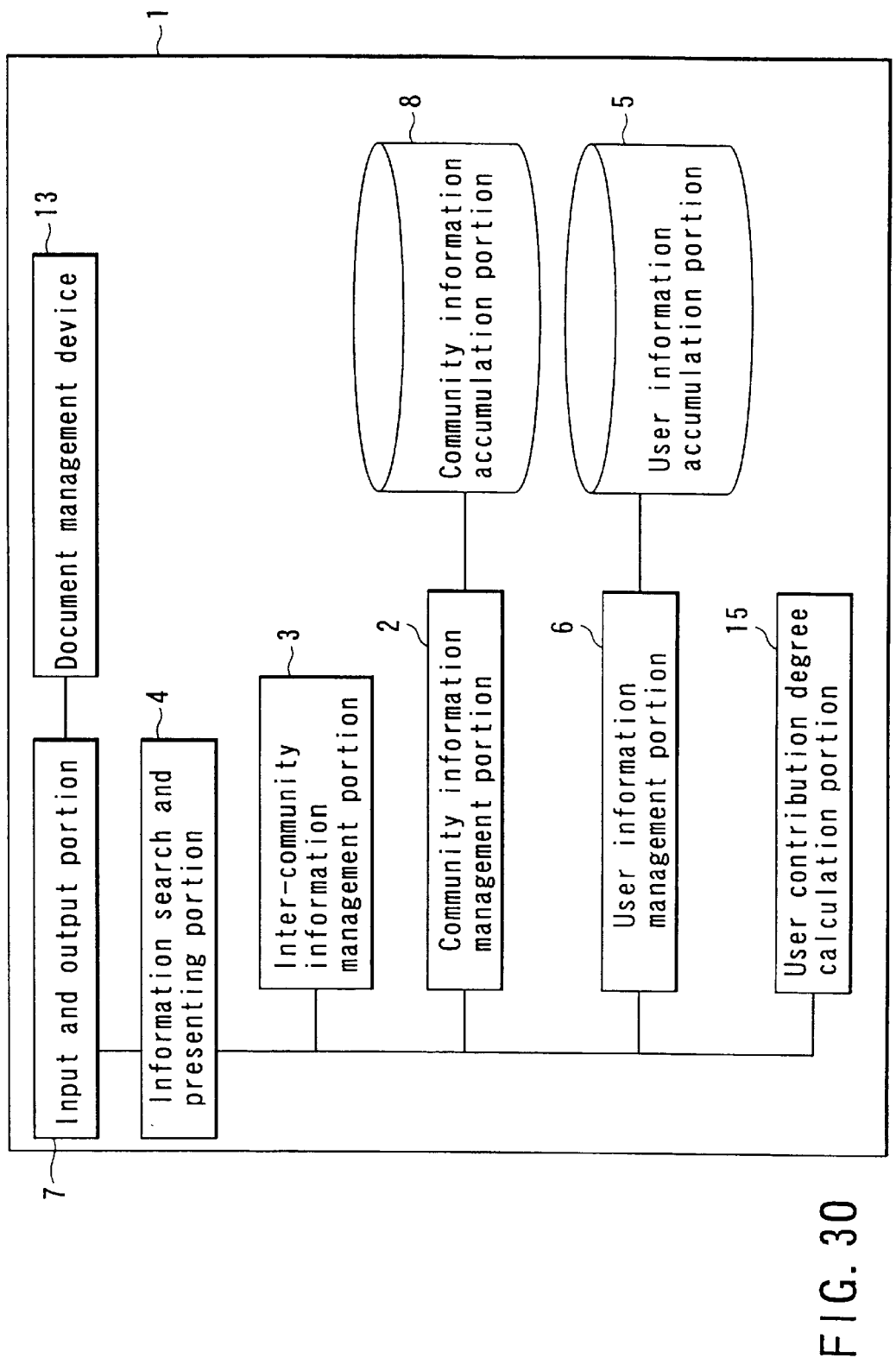
FIG. 30 is a diagram showing a functional structure of a server device according to a second embodiment of the present invention.

FIG. 30 is a functional structure of a server device 1 according to a second embodiment of the present invention, about which, only a portion different from FIG. 2 is explained hereinafter. That is, in the structure shown in FIG. 30, a user contribution degree calculation portion 15 is further added for calculating user's contribution degree in document creation.

FIG. 31 is an example of user information accumulated in the user information accumulation portion 5, and is almost same as FIG. 20, but only portions different from FIG. 20 are explained. That is, in FIG. 31, the user information consists of user ID 761, name of user and belonging, mail address, log file name to accumulate personal system use history, and further a contribution degree record table 764.

The contribution degree record table 764 describes how much contribution the user has been made to the community to which the user belongs. By the way, in FIG. 31, the values of contribution degree are regulated so that the total of contribution degree of all the users of each community to the community should become "1".

Figure 32:
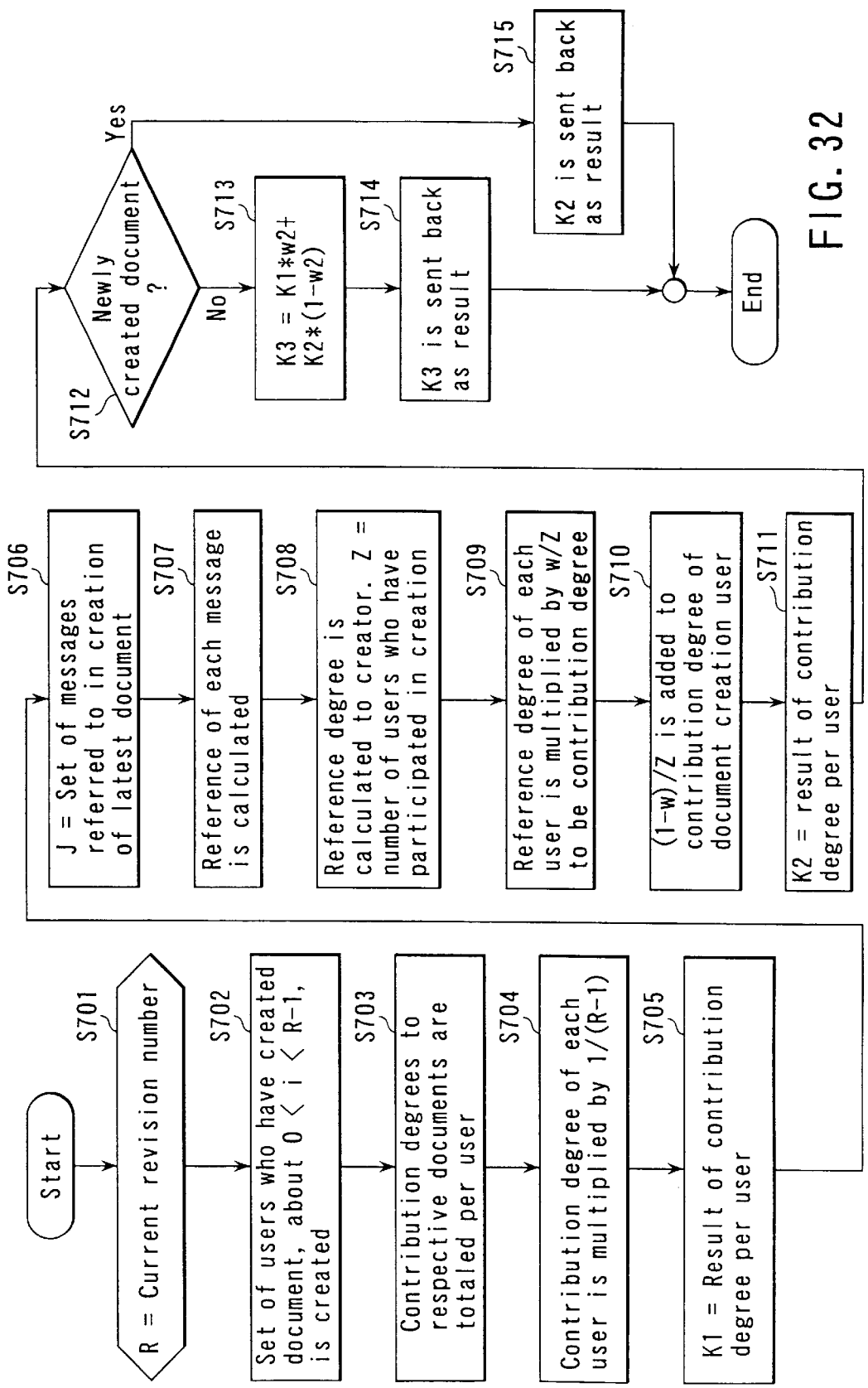
FIG. 32 is a flow chart for explaining processing actions to calculate contribution degree of a user to a certain document.

FIG. 32 is a flow chart for explaining processing actions to calculate contribution degree of a user to a certain document to be identified by a certain document identification information piece in the user contribution degree calculation portion 15, and in reference to this flow chart, explanations are made hereinafter.

Documents are updated as time goes on, however, in the processing in FIG. 32, contribution degree to documents are given to the user who is contributing to the document that is the latest document revision information, and the user who is the creator of the message referred to at the creation of the document that is the latest revision information.

First, the contribution degree to the user of the document of the revision number before the latest is obtained as below. When the latest version is set with revision number R, first, a set of creators who have gained contribution degrees is created, to each document of revision number $i(0<I<R-1)$, and the contribution degrees are totaled per each creator (steps S701 to S703). The result of regulating the contribution degree by the number of updates before the latest (namely, "R-1") (step S704) is set as the contribution degree K1 to the updated documents before the latest (step S705).

Next, the contribution degree to the creator of the message referred to at creation of the document of the latest revision number is calculated. First, a set J of messages referred to at creation of the latest document is obtained, and the degree of references per message is calculated. This may be calculated, for example, by regulating the number of lines referred to by the number of lines of document, and the like (steps S706 and S707).

This result per message is totaled per user as creator, and the reference degree of message per creator of the number Z (the number of users who participated in creation) is totaled (step S708). This value is regulated by the number of creators Z, and further the obtained value is multiplied by weight w ($0 \leq w \leq 1$), thereby contribution degree per user is obtained (step S709).

Finally, contribution degree $(1-W)/Z$ is given to the user who has actually created the document (step S710), which is made as contribution degree K2 to the latest document creation obtained per user (step S711).

By the way, the weight w used in the step S709 and the step S710 is a parameter to designate how much contribution degree should be distributed to labor of the user who has actually created the latest document.

Finally, the contribution degree K1 up to the document of the revision number before the latest revision number, and the contribution degree K2 at creation of the document of the latest revision number are totaled to obtain the contribution degree K3 per user to documents.

When a document is newly created, since there is no document of former revision number, K2 becomes the result (step S715). Otherwise, K1 and K2 are totaled by use of weight w2 (0≦w2-1), and thereby the result K3 is obtained (steps S713 and S714).

By the way, the weight w2 used herein is a parameter for designating how much the labor of user participating in creation of the document of old revision number is evaluated as contribution degree.

Figure 33:
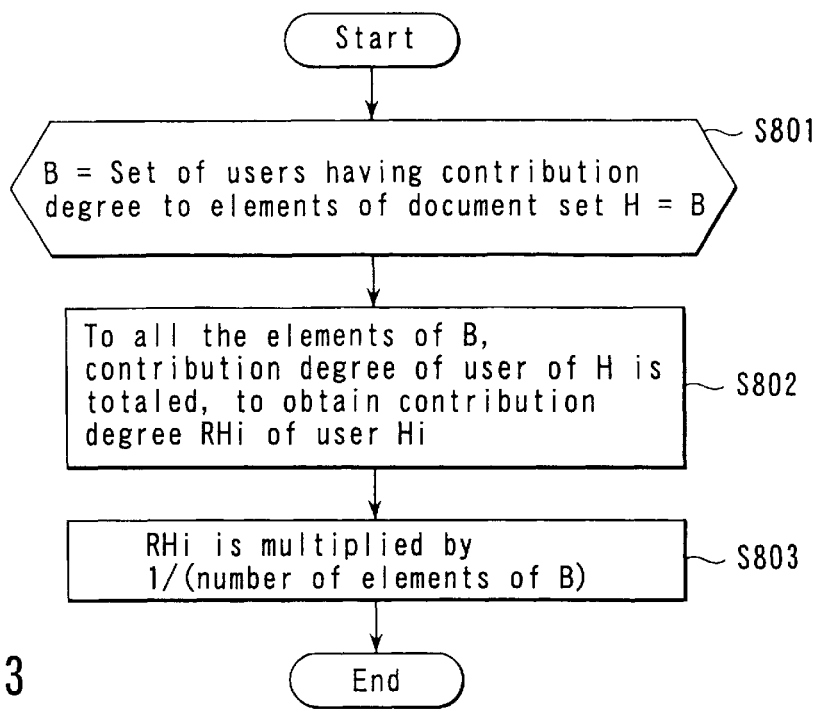
FIG. 33 is a flow chart for explaining processing actions for obtaining contribution degree of a user to a community.

FIG. 33 is a flow chart for explaining processing actions for obtaining contribution degree of a user to a community the user contribution degree calculation portion 15. First, by the processing actions shown in FIG. 32, user's contribution degree to all the documents in a certain community is obtained, and a set H of users who have contributed more or less to documents in the community is generated (step S801). Then, contribution degree to documents as elements of the document set B in the community is totaled per user (step S802), and finally, the contribution degree per user as element of the set H is regulated by the number of elements of the set B (the number of documents) (step S803).

Through the processing, the user contribution degree calculation portion 15 can obtain contribution degree of user to community. The contribution degree of user to community may also be used to enhance the management authority of users having high contribution degrees to community (for example, authority to permit new users to participate in community, authority to permit documents in community to be made public to outside, etc.). For example, authority for updating the management data of shared information shown in FIG. 18, and the community information shown in FIG. 19 may be given.

(Effects)

As explained heretofore, according to the first embodiment of the present invention, it is possible to refer to messages exchanged in process of document creation in efficient manners, thereby it makes easier for new users in community to grasp documents shared in the community and the transitions and backgrounds of document creation, as a result, sharing information in each community will be promoted.

By setting whether or not to make documents and messages public to outside of community, for example, it is possible to sort out documents that should not be made public to other communities, and document that have been made public, accordingly, in each community, it is possible to carry out confidential discussions without leaking them to other communities, as a consequence, sharing knowledge (documents) among communities will be facilitated.

By searching for and presenting not merely messages and documents similar to search string from all the communities, but also communities where fields similar to search request are discussed, it is possible for users to find out and participate in communities in which they are interested.

Also by searching for and presenting community preferable as message posting destination, it is possible to users to have discussions in community in which they are interested, which will help community to invite users' participation.

In search for communities, the more the number of documents made public a community has, the more frequently such a community is presented among the research results, accordingly, such a community having more documents created and made public will be likely to attain more new users. For communities, frequent participation of new users will help activate discussions, therefore, creating many document that may be made public to members of other communities will lead to profits of the whole communities, which in turn will motivate creation of documents.

Further, by introducing communities where discussions are made on similar topics to each other, it is possible to integrate places for discussions by users who have same interest, thereby, for users, it is possible to select their communities suitably, while, for communities, it is possible to prevent members participating in discussions from dispersing.

Further, it is possible to inform members of community of existence of users who are interested in similar topics but do not know the existence of community or cannot take part in community. Thereby, it is possible to easily take in users who are interested in community, which in turn will activate discussions in community.

Still further, on the basis of search result, by informing members of a specific community of request for document creation from a user out of the specific community, creation of public documents in the community is motivated, and sharing information is facilitated.

According to the second embodiment of the present invention, by calculating and managing the contribution degree of users who have created documents to community, it is possible to fairly evaluate members who have contributed in creating documents that can be shared from messages as flow information. Thereby, creation of shared documents by each member will be motivated more, and sharing information will be promoted.

By the way, the approaches described in the first and second embodiments may be contained in and distributed in form of recording media such as DVD, CD-ROM, floppy disk, individual memory, optical disk and the like, as a program to be executed by a computer.

The approaches of the present invention described in the embodiments of the present invention may be contained in and distributed in form of recording media such as magnetic disks (floppy disk, hard disk, and the like), optical disks (CD-ROM, DVD, etc.), semiconductor memory, and the like, as a program to be executed by a computer.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A document management method for, concerning the document that can be owned jointly by the respective users of the plural terminal devices via a network, renewing the document by reflecting an editing intention shown by each of the users while managing the renewal history of the document, the method comprising:

generating a community in which an access authority is controlled;

generating a plurality of message trees in the community, each of which accepts a message from users using the terminal devices, the message being in reply to the other message in the message tree;

editing a plurality of documents each of which is associated with one of the message trees;

generating additive message subjected to a change within one of the documents, the additive message being written into the corresponding message tree by one of the users who made the change;

generating a bidirectional reference between the additive message and the corresponding document; and searching for one of the documents as an instructive knowledge for at least one of the users in the community, wherein the corresponding massage tree is referred to by said one of users using the found document.

2. The method according to claim 1, further comprising:

making one of the documents open to the public by controlling the access authority in the community; and accepting a message from unauthorized user regarding the document that is made open to public; and writing the message into the corresponding message tree.

3. The method according to claim 2, further comprising:

making the message accepted from the unauthorized user open to the user within the corresponding message tree in the community while keeping other messages secret to the user.

4. The method according to claim 1, further comprising:

measuring the users contribution in the community; and giving the users authority commensurate with the measured contribution in the community.

5. A document management method for, concerning the document that can be owned jointly by the respective users of the plural terminal devices via a network, renewing the document by reflecting an editing intention shown by each of the users while managing the renewal history of the document, the method comprising:

generating a plurality of communities in each of which an access authority is controlled;

generating a plurality of message trees in each of the communities, each of the message trees accepting a message from users using the terminal devices, the message being in reply to the other message in the message tree;

editing a plurality of documents each of which is associated with one of the message trees;

generating additive message subjected to a change within one of the documents, the additive message being written into the corresponding message tree by one of the users who made the change;

generating a bidirectional reference between the additive message and the corresponding document; and searching for one of the communities which includes documents as an instructive knowledge for the users.

6. The method according to claim 5, further comprising:

accepting a message whose destination in the communities is undecided; and generating guidance information based on a content of the accepted message; and displaying the guidance information for guiding the user.

7. The method according to claim 6, further comprising:

calculating similarities of communities; and listing the communities in the order of the similarities.

8. The method according to claim 5, further comprising:

making one of the documents open to the public by controlling the access authority in one of the community; and accepting a message from unauthorized user regarding the document that is made open to public; and writing the message into the corresponding message tree.

9. The method according to claim 8, further comprising:

making the message accepted from the unauthorized user open to the user within the corresponding message tree in the corresponding community while keeping other messages secret to the user.

10. The method according to claim 7, wherein, when the contents of a message registered in the specified community by a user of a specific community among the plural communities and documents corresponded to the registered message are similar to the contents of messages and documents registered in other communities, the existence of the other communities is informed to the user of the specific community.

11. The method according to claim 7, wherein, when the contents of a message registered in the specified community by a user of a specific community among the plural communities and documents corresponded to the registered message are similar to the contents of messages and documents registered in other communities, the existence of the user of the specific community is informed to at least one member of the other communities.

12. The method according to claim 7, wherein, when the contents of messages and documents registered in a specified community among the plural communities are similar to documents registered in other communities, the existence of the documents registered in the other communities is informed to each member of the specified community.

13. The method according to claim 7, wherein, when the contents of messages and documents registered in a specified community among the plural communities are similar to documents registered in other communities, the existence of the other communities is informed to each member of the specified community.

14. The method according to claim 7, wherein, when to search for documents in response to a search request from a user with at least one of a character string and the message and the designated as a search key word, if there is not any document that can be presented as an answer to the search request, though there exist messages and documents similar to the search key word in a certain community among the plural communities, a notice is made to at least one of the members of the specific community to make it possible to present documents similar to the search key word to members of other communities.

15. The method according to claim 7, further comprising:

measuring the users contribution in the communities; and giving the users authority commensurate with the measured contribution in the communities.

16. A document management apparatus for, concerning the document that can be owned jointly by the respective users of the plural terminal devices via a network, renewing the document by reflecting an editing intention shown by each of the users while managing the renewal history of the document, the apparatus comprising:

a first generating device configured to generate a community in which an access authority is controlled;

a second generating device configured to generate a plurality of message trees in the community, each of which accepts a message from users using the terminal devices, the message being in reply to the other message in the message tree;

an editor to edit a plurality of documents each of which is associated with one of the message trees;

a third generating device configured to generate additive message subjected to a change within one of the documents, the additive message being written into the corresponding message tree by one of the users who made the change;

a fourth generating device configured to generate a bidirectional reference between the additive message and the corresponding document; and a searching device configured to search for one of the documents as an instructive knowledge for at least one of the users in the community, wherein the corresponding massage tree is referred to by said one of users using the found document.

17. A document management apparatus for, concerning the document that can be owned jointly by the respective users of the plural terminal devices via a network, renewing the document by reflecting an editing intention shown by each of the users while managing the renewal history of the document, the apparatus comprising:

a first generating device configured to generate a plurality of communities in each of which an access authority is controlled;

a second generating device configured to generate a plurality of message trees in each of the communities, each of the message trees accepting a message from users using the terminal devices, the message being in reply to the other message in the message tree;

an editor to edit a plurality of documents each of which is associated with one of the message trees;

a third generating device configured to generate additive message subjected to a change within one of the documents, the additive message being written into the corresponding message tree by one of the users who made the change;

a fourth generating device configured to generate a bidirectional reference between the additive message and the corresponding document; and a searching device configured to search for one of the communities which includes documents as an instructive knowledge for the users.

* * * * *